United States Patent
Zamani et al.

(10) Patent No.: US 11,102,015 B2
(45) Date of Patent: Aug. 24, 2021

(54) SYBIL-RESISTANT IDENTITY GENERATION

(71) Applicant: Visa International Service Association, San Francisco, CA (US)

(72) Inventors: Mahdi Zamani, Palo Alto, CA (US); Abhinav Aggarawal, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/625,221

(22) PCT Filed: Oct. 9, 2018

(86) PCT No.: PCT/US2018/055033
§ 371 (c)(1),
(2) Date: Dec. 20, 2019

(87) PCT Pub. No.: WO2019/216949
PCT Pub. Date: Nov. 14, 2019

(65) Prior Publication Data
US 2021/0051031 A1     Feb. 18, 2021

Related U.S. Application Data

(60) Provisional application No. 62/668,633, filed on May 8, 2018.

(51) Int. Cl.
*H04L 29/06* (2006.01)
*H04L 9/32* (2006.01)
*H04L 9/08* (2006.01)

(52) U.S. Cl.
CPC .......... *H04L 9/3271* (2013.01); *H04L 9/0861* (2013.01); *H04L 9/3218* (2013.01); *H04L 9/3239* (2013.01); *H04L 2209/463* (2013.01)

(58) Field of Classification Search
CPC ... H04L 9/3271; H04L 9/0861; H04L 9/3218; H04L 9/3239; H04L 2209/463
See application file for complete search history.

(56) References Cited

U.S. PATENT DOCUMENTS

| | | | |
|---|---|---|---|
| 9,501,363 B1* | 11/2016 | Ottavio | G06F 11/0709 |
| 2012/0054322 A1* | 3/2012 | Steiner | H04L 67/104 |
| | | | 709/223 |

(Continued)

FOREIGN PATENT DOCUMENTS

| | | |
|---|---|---|
| WO | 2017192837 | 11/2017 |
| WO | 2018044304 | 3/2018 |
| WO | 2018065395 | 11/2018 |

OTHER PUBLICATIONS

Andrychowicz et al., "PoW-Based Distributed Cryptography with No Trusted Setup", University of Warsaw, Available online at: https://www.iacr.org/archive/crypto2015/92160235/92160235.pdf, 2015, 20 pages.

(Continued)

*Primary Examiner* — Gary S Gracia
(74) *Attorney, Agent, or Firm* — Kilpatrick Townsend & Stockton LLP

(57) ABSTRACT

A method is disclosed. A node in a plurality of nodes can perform an identity set generation process. The node can then determine a leader node. The node may diffuse an identity set from each node of the plurality of nodes to the plurality of nodes. The node can then determine a majority set including identities occurring in at least one half of the identity sets, wherein the leader node diffuses the majority set of the leader node to the plurality of nodes. The node can verify the majority set of the leader node. The node may then update the identity set based on the majority set of the leader node.

19 Claims, 6 Drawing Sheets

(56) References Cited

U.S. PATENT DOCUMENTS

| | | | | |
|---|---|---|---|---|
| 2016/0183093 | A1* | 6/2016 | Vaughn | H04L 63/14 455/528 |
| 2016/0253622 | A1* | 9/2016 | Sriram | H04L 63/126 713/179 |
| 2016/0379212 | A1* | 12/2016 | Bowman | H04L 9/3239 705/71 |
| 2017/0034197 | A1* | 2/2017 | Daniel | H04L 9/3236 |
| 2017/0075941 | A1* | 3/2017 | Finlow-Bates | H04L 9/3239 |
| 2017/0236123 | A1* | 8/2017 | Ali | G06Q 20/3825 705/75 |
| 2017/0237570 | A1* | 8/2017 | Vandervort | G16H 10/60 713/176 |
| 2018/0096360 | A1* | 4/2018 | Christidis | G06Q 20/02 |
| 2018/0123779 | A1 | 5/2018 | Zhang | |
| 2018/0145836 | A1* | 5/2018 | Saur | G06Q 20/3829 |
| 2018/0270244 | A1* | 9/2018 | Kumar | H04L 9/3239 |
| 2018/0341930 | A1* | 11/2018 | Moir | G06Q 20/3825 |

OTHER PUBLICATIONS

PCT/US2018/055033 , "International Search Report and Written Opinion", dated Jan. 28, 2019, 7 pages.

EP18917847.8 , "Extended European Search Report", dated May 13, 2020, 7 pages.

Kokoris-Kogias et al., "Enhancing Bitcoin Security and Performance with Strong Consistency via Collective Signing", Arxiv.Org Cornell University Library, Olin Library Cornell University, Feb. 23, 2016, 17 pages.

Wang et al., "A Survey on Consensus Mechanisms and Mining Management in Blockchain Networks", Arxiv.Org Cornell University Library, Olin Library Cornell University, May 7, 2018, 33 pages.

Zamani et al., "RapidChain : Scaling Blockchain via Full Sharding", Computer and Communications Security, Jan. 15, 2018, 38 pages.

Application No. CN201880048468.4 , Office Action, dated Jul. 1, 2020, 14 pages.

* cited by examiner

US 11,102,015 B2

SYBIL-RESISTANT IDENTITY GENERATION

CROSS REFERENCE TO RELATED APPLICATIONS

This application is the US national stage of PCT/US2018/055033, filed Oct. 9, 2018, which claims priority to U.S. Provisional Application No. 62/668,633 filed on May 8, 2018, both of which are incorporated herein by reference.

BACKGROUND

Many decentralized systems rely on a trusted third party to generate a set of Sybil-resistant identities for the participants of the system. In the absence of such a party, it becomes challenging to establish this set while preserving the required security properties. Although there is recent work that presents solutions to this problem, all known schemes have large communication and computation overheads.

Other decentralized systems rely on a consensus protocol that allows its participants to collectively decide on the protocol outcomes, without requiring any trusted party. Such a consensus protocol essentially provides a voting mechanism through which every participant is assigned a single vote, after being "uniquely identified" by the system as an individual entity. Such an identification mechanism is used to impede double-voting and, in general, Sybil attacks, where an adversary can maliciously influence the collective decisions of the system by taking over the majority of identities and, consequently, the majority of the votes.

Embodiments of the invention address these and other problems individually and collectively.

BRIEF SUMMARY

One embodiment of the invention relates to a method comprising: performing, by a node in a plurality of nodes, an identity set generation process; determining, by the node, a leader node; diffusing, by the node, an identity set from each node of the plurality of nodes to the plurality of nodes; and determining, by the node, a majority set including identities occurring in at least one half of the identity sets, wherein the leader node diffuses the majority set of the leader node to the plurality of nodes.

Another embodiment of the invention relates to an identity set generation process. The identity set generation process comprising: generating, by the node, a public key, a private key, and a random challenge string; transmitting, by the node, the random challenge string to the plurality of nodes; receiving, by the node, a plurality of random challenge strings from the plurality of nodes; generating, by the node, a challenge set comprising the plurality of random challenge strings and the random challenge string; determining, by the node, a nonce that solves a proof of work; transmitting, by the node, a tuple comprising the public key, the nonce, a hash value from the proof of work, and the challenge set to the plurality of nodes; receiving, by the node, a plurality of tuples from the plurality of nodes; and verifying, by the node, the plurality of tuples, wherein if a tuple of the plurality of tuples is valid then storing a public key associated with the tuple in an identity set.

Another embodiment of the invention relates to a node comprising: a processor; a memory device; and a computer-readable medium coupled to the processor, the computer-readable medium comprising code executable by the processor for implementing a method comprising: performing, by a node in a plurality of nodes, an identity generation set process; determining a leader node; diffusing an identity set from each node of the plurality of nodes to the plurality of nodes; and determining a majority set including identities occurring in at least one half of the identity sets, wherein the leader node diffuses the majority set of the leader node to the plurality of nodes.

Further details regarding embodiments of the invention can be found in the Detailed Description and the Figures.

DETAILED DESCRIPTION

Figure 1:
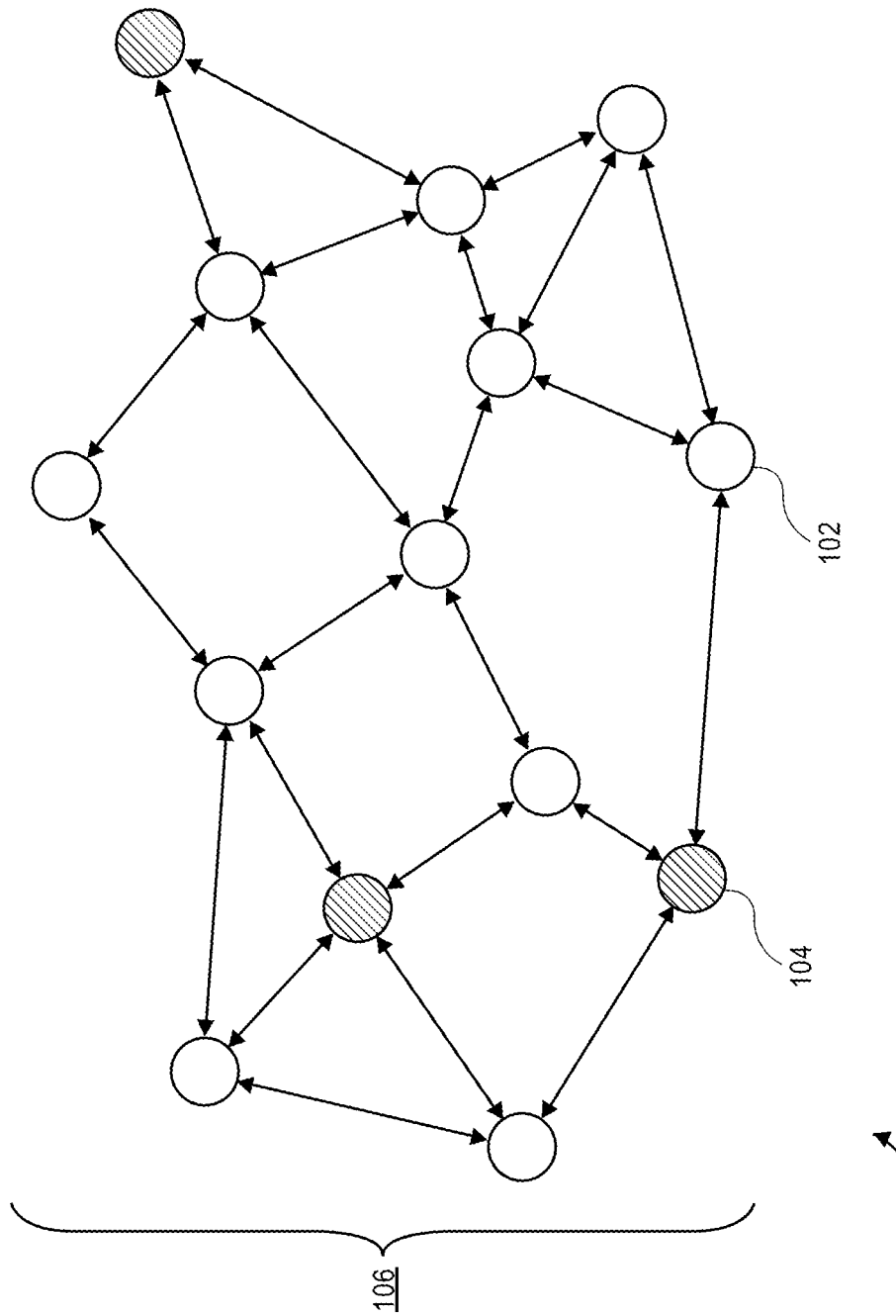
FIG. 1 shows a block diagram of a system illustrating a node network according to embodiments of the invention.

Prior to discussing embodiments of the invention, some terms can be described in further detail.

A "key pair" may include a pair of linked encryption keys. For example, a key pair can include a public key and a corresponding private key. In a key pair, a first key (e.g., a public key) may be used to encrypt a message, while a second key (e.g., a private key) may be used to decrypt the encrypted message. Additionally, a public key may be able to authenticate a digital signature created with the corresponding private key. The public key may be distributed throughout a network in order to allow for authentication of messages signed using the corresponding private key. Public and private keys may be in any suitable format, including those based on RSA or elliptic curve cryptography (ECC). In some embodiments, a key pair may be generated using an asymmetric key pair algorithm. However, a key pair may also be generated using other means, as one of ordinary skill in the art would understand. In some embodiments, a private key may be referred to as a secret key.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. A server computer may also be in the form of a collection of computers in the cloud that services the requests of one or more client computers.

The term "node" may refer to a connection point. In some embodiments, a node may be a physical electronic device that is capable of creating, receiving, or transmitting data. In some embodiments, a node may be a computing device within a network. In some embodiments, a node may be a server computer. In other embodiments, a node may be a software module on a computing device, the software module a connection point in a communication network. An "honest node" may be a node that performs operations honestly. An honest node may not be operated by an adversary or a malicious party.

A "leader node" can include a node that is selected and/or determined, by other nodes, to be a leader. In some embodiments, a leader node may be a node that has determined a lowest hash value from a proof of work compared to the hash value determined by other nodes. A leader node can be said to lead the other nodes during a round. A leader node can be capable of diffusing a majority set of the leader node to a plurality of nodes during a round.

An "identity set" can include group of node identities. Each node may store an identity set. The identity set may include identities that a node currently believes are honest. In some embodiments, one node's identity set may be different than another node's identity set. Once all honest nodes agree on an identity set that is the same, or substantially the same, an honest node may know the identities of each of the other honest nodes.

An "identity" can include any suitable identifier that identifies a node. A node can locally create a random string which can be a randomly generated public key of a public/private key pair. In some embodiments, the public/private key pair can be the identity of the node. In other embodiments, an identity of a node, also referred to as $ID_i$, can be a tuple comprising a public key, a nonce, a hash value, and a challenge set, as described herein.

A "majority set" can be a set that includes node identities that occur in at least one half of the identity sets obtained by a node. A leader node can diffuse a majority set of the leader node to a plurality of nodes.

A "challenge set" can be a set including random challenge strings. A node may create a challenge set after receiving a plurality of random challenge strings. A random challenge string may be a random value determined by a node. A random challenge string may be in any suitable range, for example, in the range of $\{0,1\}^\kappa$, where $\kappa$ can be a security parameter.

A "proof of work" and/or a "proof of work process" can include problem that may be more computationally difficult to solve than to verify the solution. Performing a proof of work process can be a random process with low probability such that a lot of trial and error is performed on average before a valid proof of work is generated. A proof of work can be modeled by a hash function. Inputs to a hash function can include public keys, challenge sets, nonces, and/or other suitable data. An output of the hash function can be a hash value. For example, the proof of work process can be $h_i = H(pk_i \| C_i \| x_i) < d$, as described herein.

A "nonce" can include any number, string, bit sequence, or other data value. A nonce can be used in a proof of work process to vary the input to a hash function so as to obtain a hash for a certain input, where the hash fulfills a requirement, such as being lower than a difficulty value.

A "hash value" can include an output of a hash function. A hash function may be part of a proof of work process. A hash value can be a real number in any suitable range, for example, the range of (0,1). Data may be processed through a cryptographic algorithm, such as a proof of work process, and a unique numerical value—the hash value—is produced. If the input data is modified in any way, then the hash value can also change significantly.

A "tuple" can include a sequence and/or ordered list of elements. A tuple can include any suitable data, such as, for example, a public key, a nonce, a hash value, a challenge set, etc. In some embodiments, a tuple may include an identity, e.g., $ID_j = (x_j, h_j, pk_j, C_j)$.

A "round" can include a recurring sequence of events. In some embodiments, a round may be a sequence of continuous time steps in which every message sent by an honest node can reach its intended recipient(s) (i.e., other node(s)) by the end of the sequence. A time step can include the minimum time it takes for a bit to be transmitted over any suitable channel. This may be similar to a standard definition of a synchronous round, in which each node can perform the following three steps: (1) receive messages from other nodes, (2) perform some local computation, if necessary, and (3) send messages to other nodes. These three steps may be atomic to any given round. Local computations, that do not involve solving computational puzzles, can be considered instantaneous.

An identity set can be split into buckets. A "bucket" can include a unit of data. In some embodiments, a bucket can include a partition and/or part of an identity set. For example, in some embodiments, an identity set $S_i$ can be split into $n_i$ buckets, where $n_i \leftarrow 2^{\lceil \log |S_i| \rceil}$. A bucket can be a partition of the identity set $S_i$. Each node can determine how many buckets to split a local set $S_i$ into. After bucketing is performed by each node, from each bucket, the nodes may determine the identity with the smallest PoW value as the leader node for that bucket. Each bucket may be processed in a round.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

I. Introduction

Embodiments of the invention can allow participants (i.e., nodes in a system) to agree on an identity set that can contain the identities of all honest nodes in the system in the presence of a computationally bounded Byzantine adversary, without any knowledge of the number of nodes that may initially want to join the system. An honest node may be a non-malicious node that behaves honestly. In some embodiments of the invention a final identity set may include a fraction of adversarial identities, where the fraction of adversarial identities in the final identity set is at most equal to the total computational hash power of the adversary. Moreover, embodiments of the invention can handle dynamic arrival and departure of nodes, while preserving the required security and bandwidth guarantees for up to a linear amount of churn in every round.

Unlike previous work, methods according to embodiments of the invention can run in an expected constant number of rounds and allows, with high probability (in the security parameter), the honest nodes to reach consensus on the identity set of the honest nodes. For applications that can tolerate a logarithmic number of rounds, embodiments of the invention can allow, with high probability (in the number of nodes), the honest nodes to reach consensus on their identity sets. In both cases, the honest nodes can send ~O(n) bits per round and can solve computational puzzles (e.g., proof of work) once during the process.

Decentralized systems often rely on some consensus protocol that allows its participants to collectively decide on the protocol outcomes, without requiring any trusted party. Such a consensus protocol essentially provides a voting mechanism through which every participant is assigned a single vote, after being "uniquely identified" by the system as an individual entity. Such an identification mechanism is used to impede double-voting and, in general, Sybil attacks [John Douceur. The Sybil attack. In *Proceedings of the Second International Peer-to-Peer Symposium (IPTPS)*, 2002], where an adversary can maliciously influence the collective decisions of the system by taking over the majority of identities and, consequently, the majority of the votes. While Sybil attacks cannot be avoided altogether, their rate can be limited so that the number of malicious identities in every consensus round is bounded, thus making the consensus problem solvable, see [M. Pease, R. Shostak, and L. Lamport. Reaching agreements in the presence of faults. *Journal of the ACM*, 27(2):228-234, April 1980].

Sybil-resistant identification of participants may require spending significant resources, especially in absence of a trusted authority, such as a third party. Every participant can perform some "hard task" such as solving a computational puzzle, see [Cynthia Dwork and Moni Naor. Pricing via processing or combatting junk mail. In *Advances in Cryptology—CRYPTO' 92: 12th Annual International Cryptology Conference* Santa Barbara, Calif., USA Aug. 16-20, 1992 *Proceedings*, pages 139-147, Berlin, Heidelberg, 1993. Springer Berlin Heidelberg], or a CAPTCHA, see [Luis Von Ahn, Manuel Blum, Nicholas J. Hopper, and John Langford. Captcha: Using hard ai problems for security. *In Proceedings of the 22Nd International Conference on Theory and Applications of Cryptographic Techniques*, EUROCRYPT'03, pages 294-311, Berlin, Heidelberg, 2003. Springer-Verlag], to make Sybil attacks hard for an adversary that has practically-limited resources. Unfortunately, such rate-limiting techniques usually impose a significant overhead to the nodes of the system, as each node performs the rate-limiting task. This cost can be amortized over multiple consensus sessions by assigning each node in the system a certificate, called an identity, that is valid for multiple sessions. The possession of the certificate can prove accomplishment of a rate-limiting task.

The identity generation problem itself can be a type of consensus problem known as interactive consistency (IC) [Marshall Pease, Robert Shostak, and Leslie Lamport. Reaching agreement in the presence of faults. *Journal of the ACM (JACM)*, 27(2):228-234, 1980], where the nodes jointly agree on a single vector of their inputs (e.g., identities) without any trusted authority. Unfortunately, existing solutions to IC [Marshall Pease, Robert Shostak, and Leslie Lamport. Reaching agreement in the presence of faults. *Journal of the ACM (JACM)*, 27(2):228-234, 1980], including solutions to other variants of the consensus problem that can be used to solve IC (e.g., Paxos [Leslie Lamport. The part-time parliament. *ACM Trans. Comput. Syst.*, 16(2):133-169, May 1998] and PBFT [Miguel Castro and Barbara Liskov. Practical byzantine fault tolerance. In *Proceedings of the Third Symposium on Operating Systems Design and Implementation*, OSDI'99, pages 173-186, 1999]), cannot be directly used to solve the identity generation problem, as all of these solutions assume identities have already been established.

Bitcoin, see [Satoshi Nakamoto. Bitcoin: A peer-to-peer electronic cash system, 2008. Available at https://bitcoin.org/bitcoin.pdf], one of the most popular decentralized systems, avoids the identity generation problem by limiting the rate of Sybil attacks via computationally-hard puzzles, known as proofs-of-work (PoWs), see [Cynthia Dwork and Moni Naor. Pricing via processing or combatting junk mail. In *Advances in Cryptology—CRYPTO' 92: 12th Annual International Cryptology Conference* Santa Barbara, Calif., USA Aug. 16-20, 1992 *Proceedings*, pages 139-147, Berlin, Heidelberg, 1993. Springer Berlin Heidelberg]. All participants attempt to solve a puzzle that is revealed in every consensus epoch by at least one of the participants. The proof generated via a proof of work process can be seen as the participant's identity for a short amount time. In Bitcoin, PoW also serves as a distributed lottery protocol to pick, in every round, an unpredictable leader node that helps with the consensus process. The unpredictability of leaders allows Bitcoin to protect its consensus protocol against fully adaptive adversaries that can choose a set of corrupted nodes at the beginning of every round, thus corrupting leaders ahead of time. In practice, however, the adversary is often assumed to be mildly adaptive, see [Eleftherios Kokoris-Kogias, Philipp Jovanovic, Linus Gasser, Nicolas Gailly, Ewa Syta, and Bryan Ford. Omniledger: A secure, scale-out, decentralized ledger via sharding. Cryptology ePrint Archive, Report 2017/406, 2017. https://eprint.iacr.org/2017/406].

Even existing blockchain protocols cannot be used for unbiased identities due to randomness issues. Although there is recent work that presents solutions to this problem, unfortunately, all known schemes are impractical due to their large communication and computation overhead. Many decentralized protocols assume the existence of a trusted setup protocol that can generate either a public-key infrastructure to authenticate its participants or a common reference string to bootstrap the protocol.

Methods according to embodiments of the invention address honest nodes that efficiently generate, and achieve consensus, on a set of Sybil-resistant identities (IDs) in a setting where no trusted setup is assumed to exist. The honest nodes can agree on a set of IDs such that the set of IDs can contain (1) the IDs of all honest nodes, and (2) at most one ID for each dishonest node in the system. In some embodiments, these IDs can be generated randomly by individual nodes that may use a key-generation algorithm to produce a key pair (pk, sk), including a public key and private key, each of which can be x bits long. The key generation phase can be local to each node and the adversary can be oblivious to the private random bits of the honest nodes. Thus, the adversary may be unable to impersonate any honest node once its public key is known to everyone, except with probability negligible in K. Moreover, the adversarial nodes can choose a key pair (pk, sk) freely. Thus the adversarial node's key pairs cannot be considered as an unbiased random string.

A. Problem Statement

An exemplary system can comprise a plurality of nodes. There can be n nodes, $P_1, \ldots, P_n$, that may want to participate in a distributed protocol running on a synchronous peer-to-peer network. However, there may be no trusted setup that will allow these nodes to identify each other, or even estimate the value of the number of nodes, n, at the beginning of the process. Each node, $P_i$, can locally create a random string, which can be referred to as its identity $ID_i$. In some embodiments, the random string can be a randomly generated public key of a public/private key pair. In other embodiments, the identity of a node can be a tuple comprising a public key, a nonce, a hash value, and a challenge set, as described herein. All honest nodes may want to agree on a set S of identities that, at least, includes the identities of all honest nodes.

An identity generation (IG) protocol can be a consensus protocol with the following properties: agreement, validity, verifiability, and termination. The agreement property can mean that all honest nodes can agree on the same identity set S. The validity property can mean that if a node $P_i$ is honest and its identity is $ID_i$, then all honest nodes can include $ID_i$ in their set S. If $P_i$ is dishonest, then the honest nodes can have either no identity or any arbitrary identity for $P_i$ in the set S. The verifiability property can mean that all honest nodes can verify the correctness of any identity in the set S. The termination property can mean that each honest node can eventually decide on the set S.

There can be two main differences between an IC protocol and an IG protocol: (1) an IC protocol may not need to provide the verifiability property; and (2) an IC protocol may output a vector instead of set. In an IC protocol, since nodes can be assumed to have already established identities, it may be possible to define an ordered set (i.e., vector) of identities.

B. Model

FIG. 1 shows a block diagram of a system 100 comprising a number of components according to some embodiments of the invention. The system comprises a number of honest nodes 102 and a number of malicious nodes 104. A plurality of nodes 106 can comprise the honest nodes 102 and the malicious nodes 104. Each node of the plurality of nodes 106 can be in operative communication with other nearby nodes. In some embodiments, each node of the plurality of nodes 106 can be in operative communication with every node of the plurality of nodes 106.

Without loss of generality, each honest node 102 and each malicious node 104 can be equipped with one unit of computational hash power, which can allow the node to perform an equivalent amount of proof-of-work (PoW). The PoW may be modeled as computation puzzles under a standard random-oracle assumption, see [Cynthia Dwork and Moni Naor. Pricing via processing or combatting junk mail. In *Advances in Cryptology—CRYPTO' 92: 12th Annual International Cryptology Conference* Santa Barbara, Calif., USA Aug. 16-20, 1992 *Proceedings*, pages 139-147, Berlin, Heidelberg, 1993. Springer Berlin Heidelberg], in a single round. Hash power can be the amount of computing power that a particular node has. For example, a more powerful computer has a higher hash power. However, it is understood that each node may have a different amount of computational hash-power.

Next, a threat model of the malicious nodes 104 will be described. A Byzantine adversary may be present, which can deviate arbitrarily from the protocol, but may not alter or delay the messages sent by the honest nodes 102. This adversary can control a number of malicious nodes 104. The adversary may be equipped with a hash power up to $f<\frac{1}{3}$ fraction of the total hash-power of the plurality of nodes 106. In other words, the total amount of adversarial hash power can be $$\frac{nf}{1-f}.$$

Such an adversary is often referred to as a computational-threshold adversary, see [C. Decker and R. Wattenhofer. Information propagation in the Bitcoin network. In *P2P*, pages 1-10. IEEE, 2013], and is commonly assumed to be able to perform only a polynomial amount of computation in each round. Embodiments of the invention may allow for formal modeling using probabilistic polynomial-time Turing machines (PPT). See [Elaine Shi and Rafael PAss. Feasibilities and infeasibilities for achieving responsiveness in permissionless consensus. *DISC*, 2017] for further details on this modeling. In some embodiments, there can be any suitable number of honest nodes 102.

Next, a network model will be described. Each pair of neighboring nodes in the network may be connected via synchronous reliable channels. To circumvent the lower bound by Lamport [Marshall Pease, Robert Shostak, and Leslie Lamport. Reaching agreement in the presence of faults. *Journal of the ACM (JACM)*, 27(2):228-234, 1980] and [Michael J Fischer, Nancy A Lynch, and Michael Merritt. Easy impossibility proofs for distributed consensus problems. *Distributed Computing*, 1(1):26-39, 1986], these channels can provide the minimal authentication functionality as required for reliable diffusion of messages and achieving consensus. Since methods according to embodiments of the invention can allow nodes to solve PoWs, the assumption of synchronous communication may be unavoidable due to the impossibility results published recently, see [Rafael Pass and Elaine Shi. Rethinking large-scale consensus. In *Computer Security Foundations Symposium (CSF)*, 2017 IEEE 30*th*, pages 115-129. IEEE, 2017] and [Juan Garay, Aggelos Kiayias, and Nikos Leonardos. The bitcoin backbone protocol: Analysis and applications. In *Annual International Conference on the Theory and Applications of Cryptographic Techniques*, pages 281-310. Springer, 2015]. The messages broadcast by any honest nodes 102 may be delivered. In some embodiments, such a broadcast mechanism can be implemented through diffusion, for example, see [R. Karp, C. Schindelhauer, S. Shenker, and B. Vocking. Randomized rumor spreading. In *Proceedings of the* 41*st Annual Symposium on Foundations of Computer Science*, FOCS '00, pages 565-, Washington, D.C., USA, 2000. IEEE Computer Society].

Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Methods according to embodiments of the invention may proceed in rounds. A round may be a sequence of continuous time steps in which every message sent by an honest node 102 can reach its intended recipient(s) (i.e., other node(s)) by the end of the sequence. A time step can be defined as the minimum time it takes for a bit to be transmitted over any suitable channel. This may be similar to the standard definition of a synchronous round, in which each node can perform the following three steps: (1) receive messages from other nodes, (2) perform some local computation, if necessary, and (3) send messages to other nodes. These three steps may be atomic to any given round. Local computations, that may not involve solving computational puzzles, can be considered instantaneous.

Figure 2:
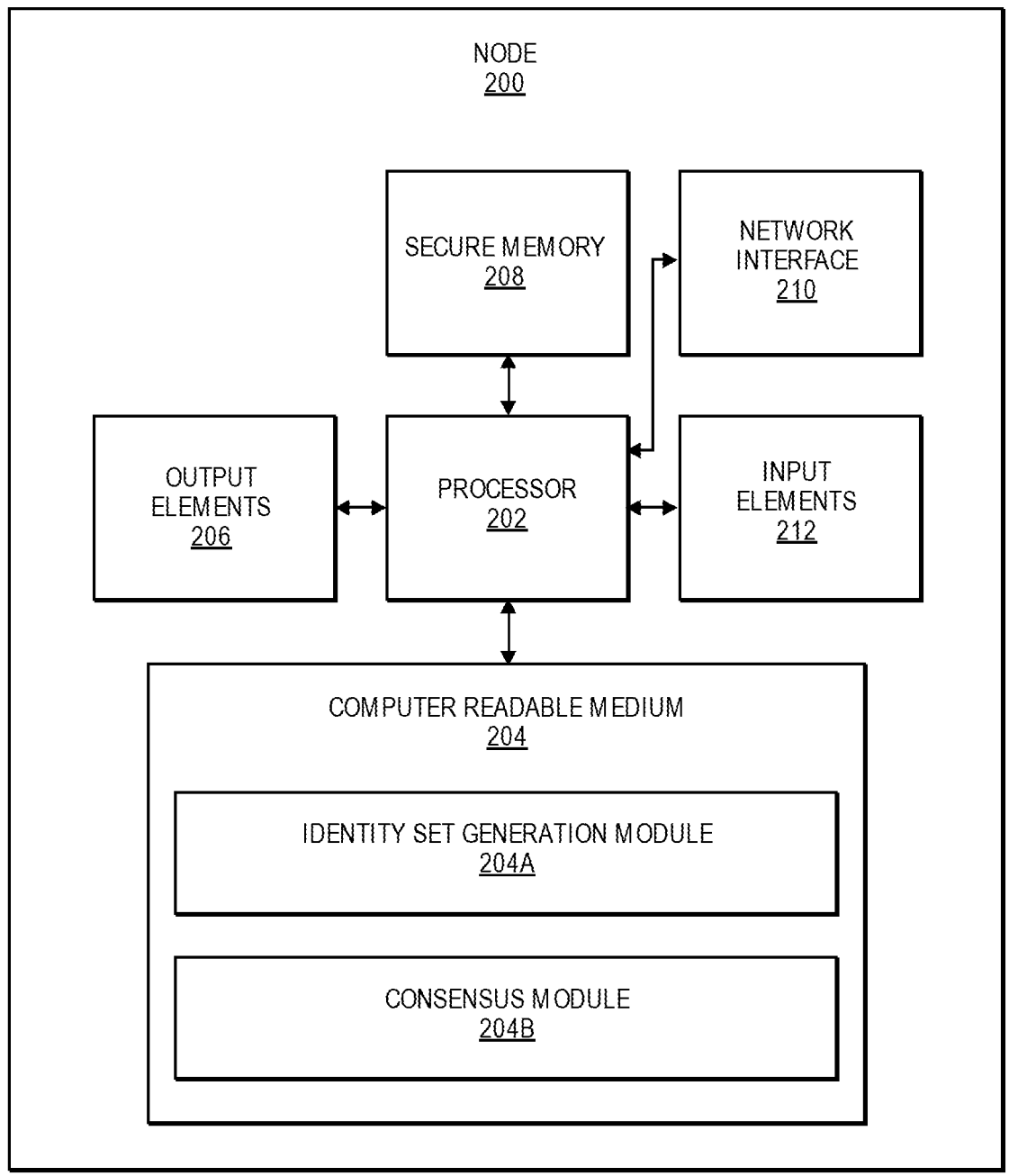
FIG. 2 shows a block diagram of components of a node according to an embodiment of the invention.

FIG. 2 shows a block diagram of components of a node according to an embodiment of the invention. The node 200 comprises a processor 202, a computer readable medium 204, output elements 206, a secure memory 208, a network interface 210, and input elements 212. The computer readable medium 204 can include a number of modules, such as an identity set generation module 204A, and a consensus module 204B.

The computer readable medium 204 may comprise code, executable by the processor 202, to implement a method comprising: performing, by a node in a plurality of nodes, an identity set generation process; determining, by the node, a leader node; diffusing, by the node, an identity set from each node of the plurality of nodes to the plurality of nodes; and determining, by the node, a majority set including identities occurring in at least one half of the identity sets, wherein the leader node diffuses the majority set of the leader node to the plurality of nodes.

The identity set generation module 204A can comprise software code that can generate, a public key, a private key, and a random challenge string; transmit the random challenge string to the plurality of nodes; receive a plurality of random challenge strings from the plurality of nodes; generate a challenge set comprising the plurality of random challenge strings and the random challenge string; determine a nonce that solves a proof of work; transmit a tuple comprising the public key, the nonce, a hash value from the proof of work, and the challenge set to the plurality of nodes; receive a plurality of tuples from the plurality of nodes; and verify the plurality of tuples, wherein if a tuple of the plurality of tuples is valid then storing a public key associated with the tuple in an identity set.

The consensus module 204B can comprise software code that can determine a leader node; diffuse an identity set from each node of the plurality of nodes to the plurality of nodes; and determine a majority set including identities occurring in at least one half of the identity sets, wherein the leader node diffuses the majority set of the leader node to the plurality of nodes.

The output elements 206 may comprise any suitable device(s) that may output data. Examples of output elements 206 may include display screens, speakers, and data transmission devices.

The secure memory 208 may store encrypted access data, key identifiers, public keys, and any other relevant data securely. The secure memory 208 may be in the form of a secure element, a hardware security module, or any other suitable form of secure data storage.

The network interface 210 may include an interface that can allow the node 200 to communicate with external computers. Network interface 210 may enable the node 200 to communicate data to and from another device (e.g., other nodes). Some examples of network interface 210 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 210 may include Wi-Fi™.

Data transferred via network interface 210 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 210 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The input elements 212 may include any suitable device(s) capable of inputting data into the node 200. Examples of input devices include buttons, touchscreens, touch pads, microphones, etc.

II. Related Work

Combating Sybil identities is discussed by Douceur [John Douceur. The Sybil attack. In *Proceedings of the Second International Peer-to-Peer Symposium (IPTPS)*, 2002] both with respect to applications where admission control is required to manage some common resource usage and in the recent advent of research in permissionless systems, see [Elaine Shi and Rafael PAss. Feasibilities and infeasibilities for achieving responsiveness in permissionless consensus. *DISC,* 2017], where participating users can join and leave at will. A popular approach is to use computational puzzles, modeled as random oracles or a manifestation of such, to prevent the malicious nodes from adding multiple identities to the system by exploiting their limited computational power. Such an idea is motivated by the seminal work by Dwork and Naor [Cynthia Dwork and Moni Naor. Pricing via processing or combatting junk mail. In *Advances in Cryptology—CRYPTO'* 92: 12*th Annual International Cryptology Conference* Santa Barbara, Calif., USA Aug. 16-20, 1992 *Proceedings*, pages 139-147, Berlin, Heidelberg, 1993. Springer Berlin Heidelberg], [Cynthia Dwork, Moni Naor, and Hoeteck Wee. Pebbling and proofs of work. In *CRYPTO*, volume 5, pages 37-54. Springer, 2005], which uses computational puzzles to battle spam emails. Aspnes et al. [James Aspnes, Collin Jackson, and Arvind Krishnamurthy. Exposing computationally-challenged *byzantine* impostors. *Department of Computer Science*, Yale University, New Haven, Conn., Tech. Rep, 2005] proposed a protocol to create a set of Sybil-resistant identities without assuming any common random setup. However, their algorithm can lead to inconsistency among the honest nodes with respect to their output sets for the identities belonging to dishonest nodes. The problems with their approach is discussed in further detail below. There are several follow up papers (see [Jonathan Katz, Andrew Miller, and Elaine Shi. Pseudonymous broadcast and secure computation from cryptographic puzzles. Cryptology ePrint Archive, Report 2014/857, 2014. https://eprint.iacr.org/2014/857], [Marcin Andrychowicz and Stefan Dziembowski. *PoW-Based Distributed Cryptography with No Trusted Setup*, pages 379-399. Springer Berlin Heidelberg, Berlin, Heidelberg, 2015], [Lisa Eckey, Sebastian Faust, and Julian Loss. Efficient algorithms for broadcast and consensus based on proofs of work. Technical report, Cryptology ePrint Archive, Report 2017/915, 2017], [Guido Urdaneta, Guillaume Pierre, and Maarten Van Steen. A survey of dht security techniques. *ACM Computing Surveys (CSUR)*, 43(2):8, 2011], and [Diksha Gupta, Jared Saia, and Maxwell Young. Proof of work without all the work. arXiv preprint arXiv:1708.01285, 2017]) that propose different types of solutions to the problem in various settings.

There can be two types of solutions to the problem: one that assumes the existence of a trusted setup, such as a PKI (public key infrastructure), and then tries to prevent Sybil IP addresses from getting access to shared resources, see [Guido Urdaneta, Guillaume Pierre, and Maarten Van Steen. A survey of dht security techniques. *ACM Computing Surveys (CSUR)*, 43(2):8, 2011], [Diksha Gupta, Jared Saia, and Maxwell Young. Proof of work without all the work. arXiv preprint arXiv:1708.01285, 2017], [Diogo Monica. Thwarting the Sybil attack in wireless ad hoc networks. *INSTITUTO SUPERIOR TECNICO (IST)*, 2009], [Satoshi Nakamoto. Bitcoin: A peer-to-peer electronic cash system, 2008. Available at https://bitcoin.org/bitcoin.pdf], [Nikita Borisov. Computational puzzles as Sybil defenses. In *Peer-to-Peer Computing*, 2006. P2P 2006. Sixth IEEE International Conference on, pages 171-176. IEEE, 2006], [Frank Li, Prateek Mittal, Matthew Caesar, and Nikita Borisov. Sybilcontrol: practical Sybil defense with computational puzzles. In *Proceedings of the seventh ACM workshop on Scalable trusted computing*, pages 67-78. ACM, 2012], [Hosam Rowaihy, William Enck, Patrick Mcdaniel, and Thomas La Porta. Limiting Sybil attacks in structured peer-to-peer networks. *Technical report, Network and Security Research Center, Department of Computer Science and Engineering*, Pennsylvania State University, USA, 2005], and [A. Kate, Y. Huang, and I. Goldberg. Distributed key generation in the wild]. While the other solution tries to design techniques to come up with such an infrastructure that is inherently Sybil-resistant, so that it can be used to bootstrap other (permissioned) systems, see [Jonathan Katz, Andrew Miller, and Elaine Shi. Pseudonymous broadcast and secure computation from cryptographic puzzles. Cryptology ePrint Archive, Report 2014/857, 2014. https://eprint.iacr.org/2014/857], [James Aspnes, Collin Jackson, and Arvind Krishnamurthy. Exposing computationally-challenged *byzantine* impostors. *Department of Computer Science*, Yale University, New Haven, Conn., Tech. Rep, 2005], [Marcin Andrychowicz and Stefan Dziembowski. *PoW-Based Distributed Cryptography with No Trusted Setup*, pages 379-399. Springer Berlin Heidelberg, Berlin, Heidelberg, 2015], [Lisa Eckey, Sebastian Faust, and Julian Loss. Efficient algorithms for broadcast and consensus based on proofs of work. Technical report, Cryptology ePrint Archive, Report 2017/915, 2017], [Tuyet Duong, Lei Fan, Thomas Veale, and Hong-Sheng Zhou. Securing bitcoin-like backbone protocols against a malicious majority of computing power. *IACR Cryptology ePrint Archive*, 2016:716, 2016], [Ruomu Hou, Irvan Jahja, Loi Luu, Prateek Saxena, and Haifeng Yu. Randomized view reconciliation in permissionless distributed systems. In *IEEE Conference on Computer Communications (INFOCOM)*. IEEE, 2018], and [Juan A Garay, Aggelos Kiayias, Nikos Leonardos, and Giorgos Panagiotakos. Boot-strapping the blockchain-directly. *IACR Cryptology ePrint Archive*, 2016:991, 2016]. Embodiments of the invention may relate to the second goal.

Katz et al. [Jonathan Katz, Andrew Miller, and Elaine Shi. Pseudonymous broadcast and secure computation from cryptographic puzzles. Cryptology ePrint Archive, Report 2014/857, 2014. https://eprint.iacr.org/2014/857], Andrychowicz and Dziembowski [Marcin Andrychowicz and Stefan Dziembowski. *PoW-Based Distributed Cryptography with No Trusted Setup*, pages 379-399. Springer Berlin Heidelberg, Berlin, Heidelberg, 2015], and Hou et al. [Ruomu Hou, Irvan Jahja, Loi Luu, Prateek Saxena, and Haifeng Yu. Randomized view reconciliation in permissionless distributed systems. In *IEEE Conference on Computer Communications (INFOCOM)*. IEEE, 2018] describe similar protocols to one another. However, there are some noticeable differences. The work by Katz et al. [Jonathan Katz, Andrew Miller, and Elaine Shi. Pseudonymous broadcast and secure computation from cryptographic puzzles. Cryptology ePrint Archive, Report 2014/857, 2014. https://eprint.iacr.org/2014/857] assumes a random beacon exists to ensure that the adversary cannot precompute computational puzzles. It then describes how a group of nodes can jointly create a (Sybil-resistant) PKI from the publicly-available random beacon. Methods according to embodiments of the invention may use reliable broadcast over PoW solutions, but, embodiments do not make the assumption of a publicly available random beacon as in prior work.

The paper by Andrychowicz and Dziembowski [Marcin Andrychowicz and Stefan Dziembowski. *PoW-Based Distributed Cryptography with No Trusted Setup*, pages 379-399. Springer Berlin Heidelberg, Berlin, Heidelberg, 2015] provides a solution with a random beacon by achieving consistency among the output of honest nodes. However, their algorithm is fairly complex and involves solutions to multiple computational puzzles from each honest node, making their approach infeasible in practice. Embodiments of the invention can improve upon this result by using a PoW once per node, thus, embodiments can be practically efficient.

Finally, the work by Hou et al. [Ruomu Hou, Irvan Jahja, Loi Luu, Prateek Saxena, and Haifeng Yu. Randomized view reconciliation in permissionless distributed systems. In *IEEE Conference on Computer Communications (INFOCOM)*. IEEE, 2018] describes the problem as a view divergence problem and provides a randomized solution, for a case when the fraction of adversarial hash power is up to a fourth of the total hash power, with a total round complexity of $\theta(\log N/\log \log N)$. Embodiments of the invention can improve this result by providing an algorithm that may run in constant number of rounds, which may assure consensus with high probability in the security parameter and may improve the resilience to adversarial hash power up to a third of the total hash power.

III. Phase I

Methods according to embodiments of the invention may proceed in two phases. At a high level, embodiments of the invention may first allow the honest nodes to locally compute an identity set for all nodes, such that the sets corresponding to any two honest nodes may differ in the identities of the dishonest nodes. Next, methods according to embodiments of the invention can use a bucketing algorithm that may select leaders for subsequent rounds, each round may bring the honest nodes a step closer to an agreement on their identity sets.

The first phase of the process may be referred to as an almost-everywhere identity agreement phase, inspired by the notion of almost-everywhere Byzantine agreement, see [C. Dwork, D. Peleg, N. Pippenger, and E. Upfal. Fault tolerance in networks of bounded degree. In *Proceedings of the eighteenth annual ACM symposium on Theory of computing*, page 379. ACM, 1986], in which not all, but almost all, honest parties are required to come to agreement. Each node can create a set of IDs, $S_1$ which may initially be empty. The first phase can proceed as follows: each honest node can locally generate a random key pair, including a public key and a private key, along with a random challenge string. Each node can diffuse its challenge string to the network (i.e., other nodes of the plurality of nodes) and may receive the challenge strings generated from other nodes. The challenge strings can be collected together in a set and, in some embodiments, can be suffixed with the node's public key. For example, this can be represented by a concatenation of strings and that membership in this set can be tested easily by each node. The node can then solve a PoW, which can be modeled by a hash function H. The node can compute a nonce x, such that when the nonce x is appended to a string formed by the concatenation of the public key and the challenge set, the result of the hash function H on the inputs can be a hash value. The hash value can be a real number in the range (0,1).

In some embodiments, a PoW can be successful if the output of the hash function H is less than some known difficulty parameter d. The difficulty parameter d can be set as a function of the bound on the network delay and the security parameter. Once a successful solution to the PoW is determined, each honest node can diffuse its solution, along with its public key, to the other nodes of the plurality of nodes. Upon receiving a solution from some node $P_j$, the recipient honest node $P_i$ can check if the PoW was computed correctly with respect to the nonce and the difficulty parameter d. The recipient honest node $P_i$ can then include the public key for $P_j$ in its local set of IDs if $P_j$ included $P_i$'s challenge string in a set of challenge strings to solve the PoW. This can prevent the adversary from making different honest nodes add different public keys for the same malicious node. $S_i$ can be the set of IDs accepted by an honest node $P_i$ at the end of the first phase.

Figure 3:
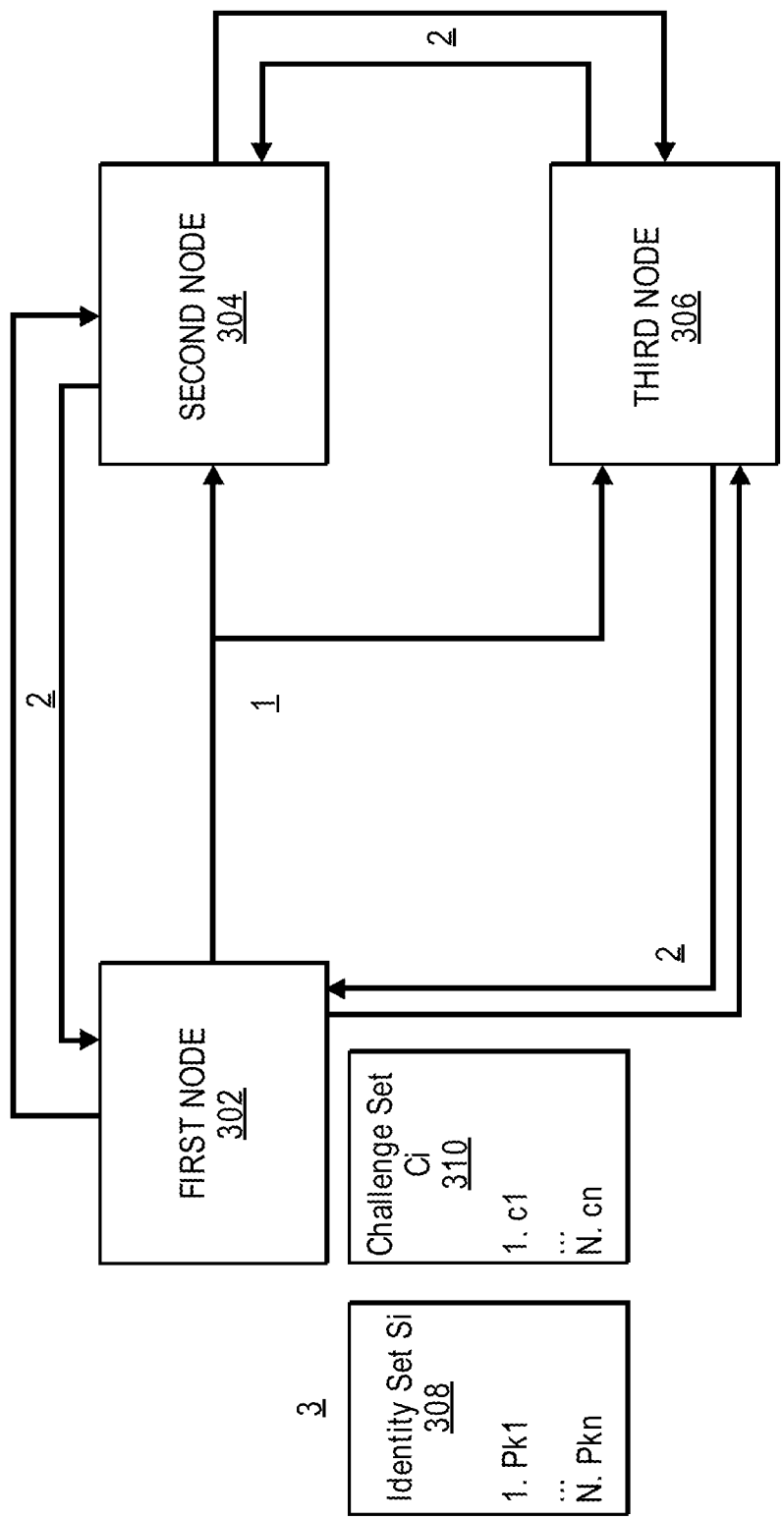
FIG. 3 shows a flow diagram illustrating an identity set generation process according to an embodiment of the invention.

FIG. 3 shows a flow diagram illustrating an identity set generation process according to an embodiment of the invention. FIG. 3 includes a first node 302, a second node 304, and a third node 306. Although the steps are illustrated in a specific order, it is understood that embodiments of the invention may include methods that have the steps in different orders. In addition, steps may be omitted or added and may still be within embodiments of the invention. In FIG. 3, a node in a plurality of nodes can perform an identity set generation process.

Before step 1, each node of the plurality of nodes may generate a random public/private key pair $(pk_i, sk_i)$ and sample a random challenge string $c_i \in \{0,1\}^\kappa$. For example, the first node 302 may generate a first public/private key pair $(pk_1, sk_1)$ and a first challenge string $c_1$.

At step 1, each node may include its own public key $pk_i$ in an identity set $S_i$ and can diffuse the random challenge string $c_i$ to each node of the plurality of nodes. For example, the first node 302 may include the first public key $pk_1$ in a first identity set $S_1$ 308 and may then transmit the first random challenge string $c_1$ to the plurality of nodes, e.g., to the second node 304 and the third node 306.

At step 2, after each node receives a random challenge string $c_i$ from every other node of the plurality of nodes, each node can determine a challenge set $C_i$ that may include the random challenge string $c_i$ received from every other node. Each node can then determine a nonce $x_i \in \{0,1\}^\kappa$ such that $h_i = H(pk_i\|C_i\|x_i) < d$, where d may be the difficulty parameter d. Each node may transmit a tuple $ID_i = (x_i, h_i, pk_i, C_i)$ to every node of the plurality of nodes. For example, the first node 302 may receive a second challenge string $c_2$ from the second node 304 and may receive a third challenge string $c_3$ from the third node 306. The first node 302 may determine a first challenge set $C_1$ 310 based on $c_1$, $c_2$, and $c_3$. The first challenge set $C_1$ 310 can include any suitable number of challenge strings, such as all of the challenge strings that the node receives.

After determining the first challenge set $C_1$ 310, the first node 302 can then determine a first nonce $x_1$ that solves a hash function H. The first node 302 can generate a first tuple $ID_1$ including the first nonce $x_1$, a first hash value $h_1$, the first public key $pk_1$, and the first challenge set $C_1$. After generating the first tuple $ID_1$, the first node 302 can transmit the first tuple $ID_1$ to every other node of the plurality of nodes. Each node can transmit a tuple comprising the public key, the nonce, a hash value from the proof of work, and the challenge set to the plurality of nodes.

At step 3, after receiving a tuple, i.e. $ID_j=(x_j, h_j, pk_j, C_j)$, from every other node of the plurality of nodes $P_j$, each node may include a received public key $pk_j$, of the tuple, in the identity set $S_i$, if the proof of work $h_j = H(pk_j\|C_j\|x_j)$ is acceptable and the node's own challenge string is in the received challenge set, i.e., $c_i \in C_j$. The node may verify the plurality of tuples, wherein if a tuple of the plurality of tuples is valid then the node can store the public key associated with the tuple in the identity set. A valid tuple can be associated with an acceptable proof of work. Additionally, a valid tuple can include a challenge set that includes the node's (i.e., node that is verifying the tuple) own challenge string $c_i$. The inclusion of the challenge set can allow a first node to determine if a different node has included the first node's challenge string in the computation of the different node's proof of work process. A node can determine that a different node is a malicious node if the malicious node's proof of work process was completed without using the appropriate challenge set.

Protocol 1, below, describes an example pseudocode for the identity set generation process shown in FIG. 3, above.

| Protocol 1: Almost-Everywhere Identity Generation |
|---|
| Sequence of steps followed by honest node $P_i$. |
| 1.    Round 1: Create a random public/private key pair $(pk_i, sk_i)$ and sample a random challenge string $c_i \in \{0,1\}^\kappa$. Add $pk_i$ to $S_i$ and diffuse $c_i$ to the network. |
| 2.    Round 2: Let $C_i$ be the set of challenges received from the previous step. Find a nonce $x_i \in \{0,1\}^\kappa$ such that $h_i = H(pk_i\|C_i\|x_i) < d$, where d is the difficulty parameter. Diffuse the tuple $ID_i = (x_i, h_i, pk_i, C_i)$ to the network. |
| 3.    Round 3: Upon receiving the tuple $ID_j = (x_j, h_j, pk_j, C_j)$ from $P_j$. Add $pk_j$ to $S_i$ if $h_j = H(pk_j\|C_j\|x_j)$ and $c_i \in C_j$. |

Next, the properties of this phase will be discussed. First, each public key can be $\Theta(\log n)$ bits long and hence, the total number of bits sent by each honest node can be $\Theta(\kappa n + n \log n) = \tilde{O}(n)$, where $\tilde{O}$ notation hides log factors. Second, the identity sets $S_1, \ldots, S_n$ may be inconsistent in the public keys that they contain. This may be because the adversary can choose to selectively send its public key (and solution to the PoW) to a subset of the honest nodes and not to others, hence, partitioning the honest nodes' views on the membership of this public key in their respective identity sets. The following lemmas can establish the properties of the sets $S_i$ at the end of the identity generation phase.

Lemma 1: let $S_h = \{pk_i | P_i \text{ is honest}\}$. Then, $S_h \subseteq S_i$ for each honest node $P_i$ at the end of the identity generation phase. This may follow from the fact that each message diffused by an honest node can be received by all other honest nodes without any corruption and by the end of the round in which it was sent. Corollary 1: let $P_i$ and $P_j$ be two honest nodes with sets $S_i$ and $S_j$, respectively, at the end of the algorithm. Let $pk \in S_i \backslash S_j$. Then pk can belong to a dishonest node.

Lemma 2: let $P_i$ and $P_j$ be two honest nodes with sets $S_i$ and $S_j$, respectively, at the end of the algorithm. Then for all $pk_1 \in S_i \backslash S_j$ and $pk_2 \in S_j \backslash S_i$, it can be the case that $pk_1$ and $pk_2$ can belong to two different nodes in the system. Since each adversary controlled node can only compute a single successful PoW in each round, it may not be possible for that node to compute the PoW with both $pk_1$ and $pk_2$ in the same round. Hence, it can be the case that these two public keys came from two different nodes in the system. Corollary 2: for each dishonest node $P_j$, there may be at most one public key $pk_i$ that the honest nodes include in their identity sets.

Corollary 3: let $S_\cap = \cap_{P_i:honest} S_i$. Then, $S_\cap$ can contain the public keys of all honest nodes and at most one public key for each dishonest node. Corollary 4: let $S_\cup = \cup_{P_i:honest} S_i$. Then, $S_\cup$ can contain the public keys of all honest nodes and at most one public key for each dishonest node.

Having established these properties about the identity sets $S_i$, a problem statement may be to achieve consensus on a set S of public keys that satisfies $S_\cap \subseteq S \subseteq S_\cup$, in accordance with the notations used in Corollaries 3 and 4. Achieving consensus on such a set S is discussed in the phase II section below.

Figure 4:
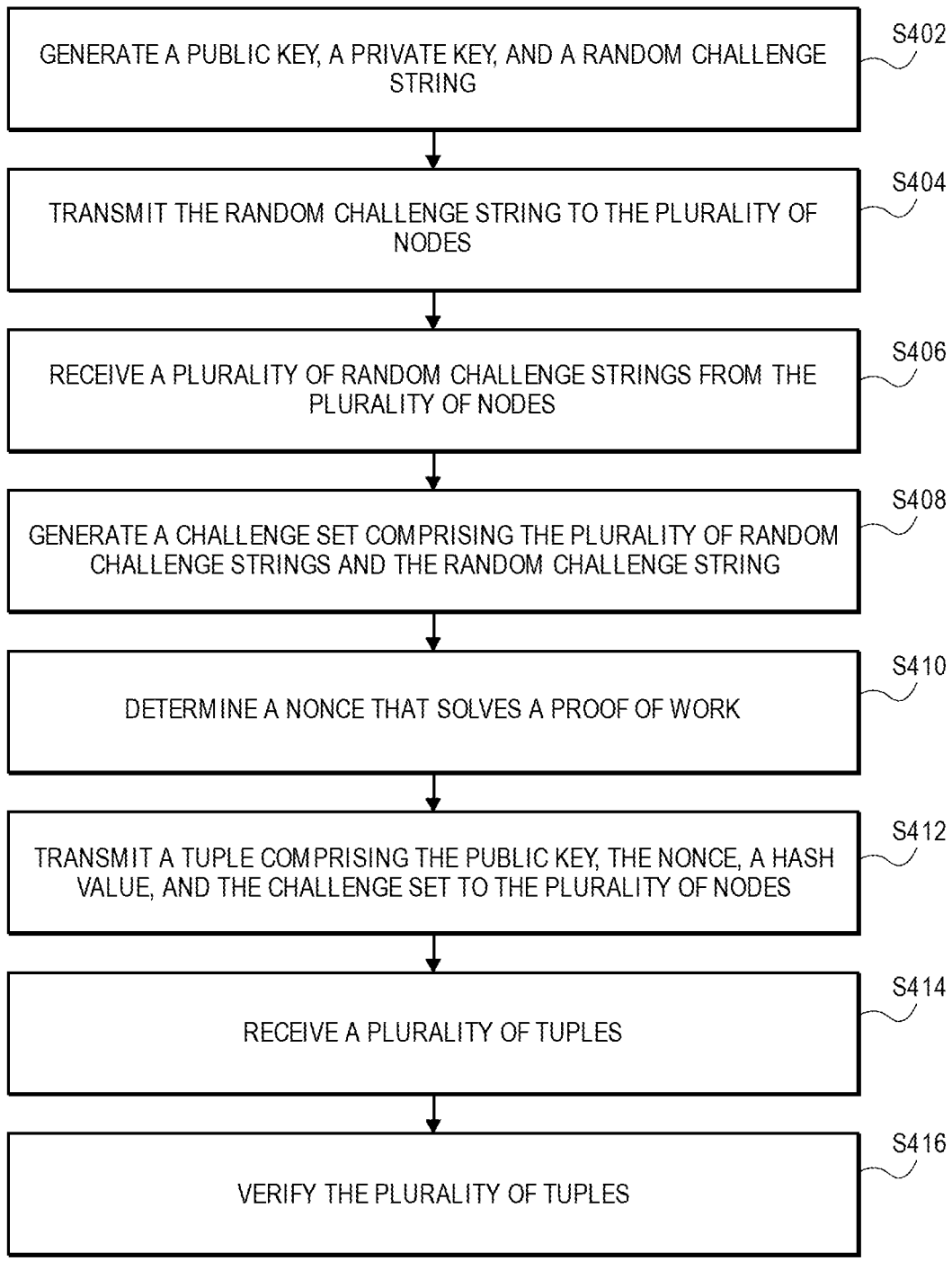
FIG. 4 shows a method of generating an identity set according to an embodiment of the invention.

FIG. 4 shows a method of generating an identity set according to an embodiment of the invention. The method illustrated in FIG. 4 will be described in the context of a system including a plurality of nodes. It is understood, however, that the invention can be applied to other circumstances (e.g., in systems or networks that want to prevent Sybil attacks, etc.). Although the steps are illustrated in a specific order, it is understood that embodiments of the invention may include methods that have the steps in different orders. In addition, steps may be omitted or added and may still be within embodiments of the invention.

Step S402 may occur when initializing a network of nodes. Each node may not store data relating to the total number of nodes that will be in the network. At step S402, each node of a plurality of nodes can generate a public key, a private key, and a random challenge string. It will be appreciated by those skilled in the art that the public/private key pair can be generated using any method suitable for use in the present invention. The random challenge string can be randomly generated, as described herein, and can have a value in the set of $\{0,1\}^\kappa$, where $\kappa$ is a predetermined security parameter. The security parameter K can indicate the strength of the value, i.e., a larger security parameter K can result in a larger random challenge string. The random challenge string can comprise K bits. Each node of the plurality of nodes can generate a different random challenge string.

At step S404, after generating the public key, the private key, and the random challenge string, each node of the plurality of nodes can transmit the random challenge string to the other nodes of the plurality of nodes.

At step S406, each node of the plurality of nodes can receive a plurality of random challenge strings from the other nodes of the plurality of nodes. Each node can receive one random challenge string from each of the other nodes. However, in some cases a malicious node can transmit a random challenge string to some nodes and not others. Due to this malicious activity, each node may receive a different number of random challenge strings.

At step S408, each node of the plurality of nodes can generate a challenge set comprising the plurality of random challenge strings. For example, in some embodiments, each of the nodes can generate the challenge set by concatenating each of the received challenge strings.

At step S410, after generating the challenge set, each node of the plurality of nodes can determine a nonce that solves a proof of work. The inputs to the proof of work can include the public key, the challenge set, and the nonce, as described herein, for example $h_i = H(pk_i || C_i || x_i) < d$. In some embodiments, determining the nonce $x_i$ that solves the proof of work can further comprise determining the hash value $h_i$, which is an output of the proof of work. Each node can determine a hash value $h_i$ that results from computing the hash function H. Each node can then determine if the hash value $h_i$ is less than a predetermined difficulty parameter d. If the hash value $h_i$ is less than the predetermined difficulty parameter d, then the node has determined an acceptable nonce $x_i$. If the hash value $h_i$ is greater than the predetermined difficulty parameter d, then the node can recompute the hash function H with a different nonce $x_i$. In some embodiments, the node can recompute the hash function H any suitable number of times. For example, a node can compute the hash function H 20, 100, 500, or 1000 times.

Each node can determine a hash value $h_i$ that is less than a predetermined difficulty parameter d by determining the correct nonce $x_i$. A malicious node will not be able to determine many nonces $x_i$ that solve multiple, possibly different, hash functions. Due to the computation of the nonce $x_i$ that solves the hash function H, a malicious node cannot create many identities since it has limited computational power and cannot compute many different proof of work processes, thus preventing Sybil-attacks. In the case that a malicious node falsifies a nonce $x_i$ and attempts to use the falsified nonce to obtain an additional identity, the honest nodes can determine that the falsified nonce does not correctly solve the hash function with the other suitable inputs to determine a hash value less than the difficulty level. The honest nodes can verify if a nonce is a falsified nonce or a correct nonce as described below in step S416.

At step S412, after determining the nonce, each node can transmit a tuple to the other nodes of the plurality of nodes. The tuple can comprise the public key, the nonce, the challenge set, and the hash value. In this way, the tuple can include the inputs to the hash function (i.e., the public key, the nonce, and the challenge set) as well as the output of the hash function (i.e., the hash value). A second node that receives the tuple can verify if the inputs to the hash function result in the output of the hash function, thus the second node can verify that the node correctly performed the proof of work. At step S414, each node of the plurality of nodes can receive a plurality of tuples. A given node can receive each tuple of the plurality of tuples from a different node of the plurality of nodes.

After receiving the plurality of tuples, at step S416, each node of the plurality of nodes can verify the plurality of tuples. A node can verify a tuple by determining if the public key, nonce, and challenge set associated with that tuple solve the hash function such that the resulting hash value, associate with the tuple, is less than the predetermined difficulty parameter d. If the node verifies a tuple, then the node can store the public key associated with the tuple in an identity set. If the tuple is not verified, for example, if the resulting hash value is greater than the predetermined difficulty parameter d, then the node can determine to not store the public key associated with the tuple in an identity set. Each node can verify each tuple that it has received. The identity set at each node, after each node verifies each tuple, can contain one identity for every honest node, however, each node may store a different identity set. Phase II below, describes how the nodes can reach a consensus on the same identity set.

IV. Phase II

In this section, the second phase will be described. First, some strawman approaches to achieving consensus on the set S of identities of the nodes, as well as their problems, will be described. Then, methods according to embodiments of the invention will be described.

A. Strawman Solutions

A first strawman solution can include local identity generation. The first strawman solution is based on the idea of achieving consensus based on a cut-and-choose technique. The main idea of this strawman solution can be as follows: (1) each node $P_i$ can choose a set $R_i$ of public keys at random from its identity set $S_i$; (2) each node $P_i$ can query each node $P_j$, whose public key $pk_j \in R_i$ (by signing messages with these keys so that only the recipients can recover the contents and know that the message is intended for them) and can request to obtain $S_j$; (3) once $S_j$ is obtained, the node $P_i$ can compute the set $T_{i,j}=S_i \backslash S_j$ of public keys that $P_j$ has not seen so far (but $P_i$ has); (4) $P_i$ can remove each ID in $T_{i,j}$ from $S_i$. Note that (4) can be valid because of Corollary 1, above.

While this approach removes some public keys belonging to dishonest nodes from $S_i$, there are two important points worth noting. (1) Since the honest nodes sample only a subset of IDs from their sets to verify, it is still possible that some dishonest IDs are not removed from the final sets. Moreover, it is likely that the final sets obtained after this process are still not in agreement and hence, this approach does not solve the problem, except with some probability. A solution should work with high probability, which is not the case here. (2) Even if consensus is achieved by this approach, by a stroke of luck, the set agreed upon (e.g., S' satisfies $S_\cap \subseteq S' \subseteq S$) and hence, this approach solves a stronger consensus problem compared to what is needed. At most one ID per dishonest node can be tolerated, while S' is unlikely to contain such an ID if the adversary chooses to hold its delivery to some honest nodes.

Next, another strawman solution will be discussed. This strawman solution includes a Bracha broadcast on each node. Each honest node $P_i$ can run a reliable broadcast, see [Gabriel Bracha. Asynchronous Byzantine agreement protocols. *Information and Computation*, 75(2):130-143, November 1987], for its set $S_i$. Each node can then construct a solution by taking a union of all the sets received as part of this broadcast. $P_i$ can only participate in broadcast instances from the IDs that are part of $S_i$ at the beginning of this process. This process can be very computationally expensive, with each node sending $\tilde{O}(n^2)$ bits in every round. Furthermore, the instances of the broadcast run by the dishonest nodes provide no guarantee of consensus on their outputs and hence, even this approach fails to provide a solution to the problem.

Yet another strawman solution can include a union of sets. This strawman solution may rely on Corollary 4 and have honest nodes carefully compute the union of their sets to agree on $S_\cup$. However, to prevent the dishonest nodes from including Sybil IDs in their sets, some form of consensus algorithm can be run to agree on what sets to take union of. Such a consensus essentially requires exact identification of what nodes are controlled by the adversary (at least knowing what nodes are equivocating and adding Sybil IDs to their local sets). Thus, each node would require the knowledge of the sets of every other node and then for each ID in the union of these sets, consensus will need to be run separately to check if the majority of nodes contain this ID in their sets or not. Such an algorithm is extremely computationally intensive, requiring each party to send $O(n^4)$ bits in each round, making it completely infeasible in practice and the intended applications. However, methods according to embodiments of the invention can carefully elect the leaders for the consensus problem by some leader election mechanism. Then this bandwidth can be reduced and the system can achieve consensus in fewer rounds. Methods according to embodiments of the invention are explained in detail in the next section.

B. Phase II (Full Agreement)

The second phase of the process can be referred to as everywhere identity agreement. Having obtained local sets $S_i$'s, agreement is sought via a protocol adopted from Ren et al., see [Ling Ren, Kartik Nayak, Ittai Abraham, and Srinivas Devadas. Practical synchronous byzantine consensus. *CoRR*, abs/1704.02397, 2017], which is an expected constant-round consensus algorithm for multi-valued inputs in a synchronous communication network. The protocol assumes a random leader-election phase as a preamble and the correctness of the their result can be dependent on this phase. In some embodiments of the invention, since the nodes may not be assumed to share any random bits or beacons, performing this random leader election is a new challenge. Methods according to embodiments of the invention can overcome this by using and building upon the partial agreement established in the first phase, described above.

In this section, the consensus phase will be discussed. The consensus phase may allow the honest nodes to come to agreement on a set S of IDs. After obtaining local sets $S_1$'s in the first phase, as described herein, the nodes may seek agreement. A similar algorithm may be from the recent work by Ren et al., [Ling Ren, Kartik Nayak, Ittai Abraham, and Srinivas Devadas. Practical synchronous byzantine consensus. *CoRR*, abs/1704.02397, 2017]. The algorithm in their paper is an expected constant-round consensus algorithm for multi-valued inputs on a synchronous communication network; which is not what embodiments of the invention perform, as their algorithm assumes a random leader election phase as a preamble and the correctness of the result is critically dependent on this phase. Whereas, in methods according to embodiments of the invention, since the nodes are not assumed to share any random bits or beacons, performing this random leader election is a challenge. Embodiments of the invention can overcome this challenge through a clever use of the solutions to the PoW computed by the nodes in the first phase, described above.

Figure 5:
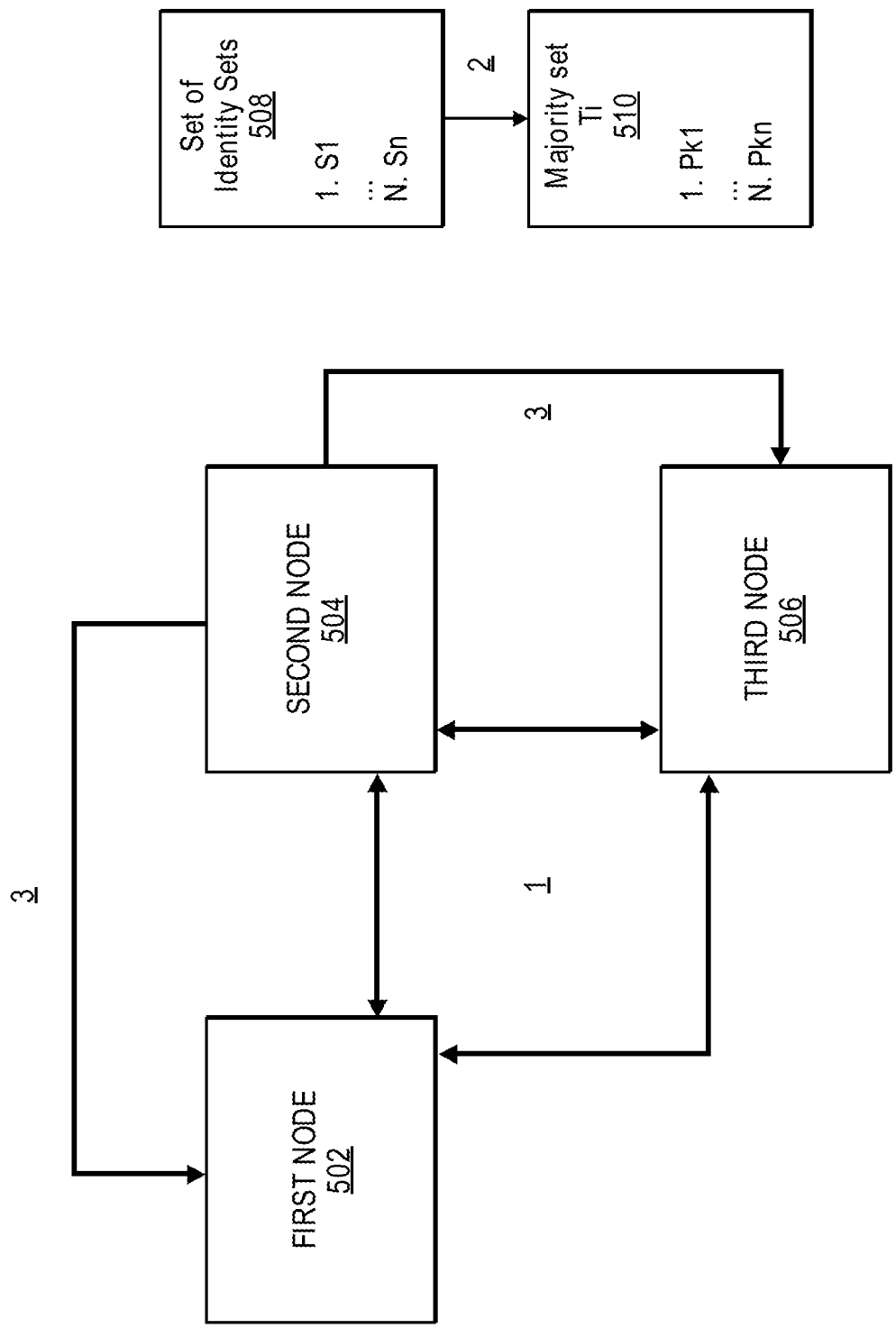
FIG. 5 shows a flow diagram illustrating a consensus process according to an embodiment of the invention.

FIG. 5 shows a flow diagram illustrating a consensus process according to an embodiment of the invention. Although the steps are illustrated in a specific order, it is understood that embodiments of the invention may include methods that have the steps in different orders. In addition, steps may be omitted or added and may still be within embodiments of the invention.

Before step 1, the nodes can split the local set $S_i$, determined in the first phase, into buckets. For example, in some embodiments, the local set $S_i$ can be split into $n_i$ buckets, where $n_i \leftarrow 2^{\lceil \log |S_i| \rceil}$. A bucket can be a partition of the identity set $S_i$. Each node can determine how many buckets to split the local set $S_i$ into. Such a value can be chosen for $n_i$ instead of just $|S_i|$ because it may allow all honest nodes to compute approximately the same value for their estimate of the total number of nodes in the system. The error in their estimates may be small in comparison to the number of rounds, and hence, can be tolerable (refer to Lemma 4). The following lemma helps establish this.

Lemma 3: for any two honest nodes, $P_i$ and $P_j$, with local sets $S_i$ and $S_j$, respectively, let $n_i=2^{\lceil \log |S_i| \rceil}$ and $n_j=2^{\lceil \log |S_j| \rceil}$. Assuming $f<n/3$, then $$\left| \frac{1}{n_i} - \frac{1}{n_j} \right| \leq \frac{3}{n}.$$

Without loss of generality, assume that $|S_i| \le |S_j|$ so that $n_i \le n_j$. Then, $$\frac{1}{n_i} - \frac{1}{n_j} = \frac{1}{2^{\lceil \log |S_i| \rceil}} - \frac{1}{2^{\lceil \log |S_j| \rceil}}$$

$$= \frac{1}{2^{\lceil \log |S_i| \rceil}} \left( \frac{1}{2^{\lceil \log |S_i| \rceil - \lceil \log |S_j| \rceil}} - 1 \right)$$

$$\le \frac{1}{|S_j|} \left( 2^{\lceil \log |S_i| \rceil - \lceil \log |S_j| \rceil} - 1 \right)$$

$$\le \frac{1}{|S_j|} \left( 2^{\log |S_i| + 1 - \log |S_j|} - 1 \right)$$

$$= \frac{1}{|S_j|} \left( \frac{2|S_j|}{|S_i|} - 1 \right)$$

Now, from Lemma 1, $|S_j| \ge n-f = 2n/3$. This can also apply for $|S_i|$. Also, from Corollary 2, $|S_j| \le n$. Thus, substituting these values:

$$\frac{1}{n_i} - \frac{1}{n_j} \le \frac{3}{2n} \left( \frac{6n}{2n} - 1 \right) = \frac{3}{n}.$$

After the bucketing is performed by each node, from each bucket, the nodes may determine the identity with the smallest PoW value as the leader node for that bucket. For example, a node can determine the leader node based on the hash value. Each bucket can be processed in a round. Thus, starting from the first bucket, rounds of a synchronous consensus protocol with the leader node of the bucket can be run to agree on S. This |S| may be computed using the majority union of all $S_i$'s, which essentially means that the public keys are added in S that belong to a majority of $S_i$'s. In some embodiments, if the protocol does not succeed in a round, the consensus protocol can be repeated with the leader node of the next bucket. This may be repeated for every bucket until the consensus protocol succeeds, which can happen in an expected constant number of rounds with high probability in x and expected logarithmic (in n) many rounds with high probability in n.

To determine the leader node, each node can transmit a hash value to every other node of the plurality of nodes. In some embodiments, each node may already have a hash value from every other node (which was received in the tuple) described in phase I. Each node can then determine the smallest hash value of the plurality of hash values received from the plurality of nodes.

Each hash value is associated with a public key, since the tuple comprises both the hash value and the public key. The public key can be the identity of the node. Each node can determine the identity associated with the smallest hash value and can select a node (e.g., a second node) that is associated with the smallest hash value and the identity to be the leader node for that round. In some embodiments, a node can determine that it is the leader node.

At step 1 in FIG. 5, after the nodes determine a leader node, the nodes can gossip their own local identity set $S_i$ to the network. Each node can transmit, or otherwise broadcast, its local identity set $S_i$ to every other node in the network. For example, the first node 502 can transmit a first local identity set $S_1$ to the second node 504 and the third node 506. The second node 504 can transmit a second local identity set $S_2$ to the first node 502 and the third node 506.

The third node 506 can transmit a third local identity set $S_3$ to the first node 502 and the second node 504.

At step 2, after receiving an identity set from each of the plurality of nodes, each node can create a set of identity sets $\mathcal{S}_i$ 508. The set of identity sets $\mathcal{S}_i$ 508 can include the identity sets $S_i$ that the node received from the other nodes. In some embodiments, each node can include their own identity set $S_i$ in the set of identity sets $\mathcal{S}_i$ 508. For example, the first node 502 can create a first set of identity sets $\mathcal{S}_1$. The first set of identity sets $\mathcal{S}_1$ can comprise the first identity set $S_1$, the second identity set $S_2$, and the third identity set $S_3$.

After creating the set of identity sets $\mathcal{S}_i$ 508, each node can determine a majority set $T_i$ 510. The majority set $T_i$ 510 may be a set that includes public keys that occur in at least one half (i.e., n/2) of identity sets $S_i$ in the set of identity sets $\mathcal{S}_i$ 508. Each node can determine the public keys that occur in at least one half of the local identity sets $S_i$ in the set of identity sets $\mathcal{S}_i$. For example, the first node 502 may determine a majority set including identities occurring in at least one half of the identity sets. The first node 502 can create the majority set comprising $Pk_1$, $Pk_2$, and $Pk_3$, if each of these three public keys occur in at least one half of the identity sets $S_i$ in the first set of identity sets $\mathcal{S}_1$.

At step 3, after determining the majority set $T_i$ 510, the leader node may determine to set its local identity set $S_i$ equal to its majority set $T_i$ 510. In other embodiments, the leader node may assign the majority set $T_i$ 510 to its local identity set $S_i$ 508. For example, if the leader node is the second node 504, then the second node 504 may assign $T_2$ to $S_2$ (e.g., $S_i \leftarrow T_i$). The leader node may then gossip the majority set $T_i$ 510 to the network. For example, the second node 504 (the leader node) can transmit, or otherwise broadcast, the majority set $T_2$ to the first node 502 and the third node 506. If a node is not the leader node, the node may receive the majority set $T_j$ from the leader node of that round.

After step 3, each node that is not the leader node can verify whether or not each public key in the received majority set $T_i$ occurs in at least one half of the identity sets $S_i$ in the set of identity sets $\mathcal{S}_i$ 508. If the nodes verify the received majority set $T_j$, then each node may determine to set its local identity set $S_i$ equal to the received majority set $T_j$. The node may update its identity set based on the majority set of the leader node. This may be referred to as a final identity set.

After a node determines a final identity set, the node can know which other nodes are honest nodes. The node can then interact with other honest nodes.

For example, in some embodiments, the node can communicate with a node whose identity is in the final identity set. The two nodes can communicate securely which any suitable encryption protocol and know that the recipient node is honest.

The honest nodes, as determined by the final identity set stored by each honest node, can perform any suitable processes performed by a plurality of honest nodes. In some embodiments, two nodes that both store a final identity set including the other's identity can perform an interaction such as a transaction. For example, two nodes may perform a transaction with the knowledge that they are performing a transaction with an honest node. A first node may contact a second node to perform a transaction. The first node and second node can agree on an amount to be transferred between nodes as well as any other goods and/or services.

In yet other embodiments, the nodes that have identities included in the final identity sets can vote. For example, each of the honest nodes can vote for a new leader node to lead further processing.

In some embodiments, after determining the final identity set, the nodes can create a blockchain comprising transactions, contracts, events, and/or other suitable data. The nodes can read and/or write to and from the blockchain. Each node may be capable of maintaining a copy of the blockchain and can verify previous blocks stored on the blockchain. For example, the plurality of nodes can receive a transaction and can verify whether or not the transaction is valid (e.g., the nodes can verify that there are sufficient funds for the transaction). The plurality of nodes can be capable of voting on whether or not to accept the transaction. If the plurality of nodes vote to accept the transaction, then the plurality of nodes can write the transaction to a block on the blockchain.

Protocol 2, below, describes an example pseudocode for phase II of the Sybil-resistant identity generation protocol as described in FIG. 5, above.

---

Protocol 2: Sybil-Resistant Identity Generation

Party $P_i$ performs the following steps:

Phase II: Everywhere Identity Agreement

1. $n_i \leftarrow 2^{\lceil \log |S_i| \rceil}$
2. Leader Election. For each $k \in \{0, \ldots, n_i - 1\}$, pick the identity $ID_j = (x_j, h_j, pk_j, c_j)$ from $S_i$ with the smallest $h_j$
   such that $\dfrac{h_j}{d} \in \left[\dfrac{k}{n_i}, \dfrac{k+1}{n_i}\right)$.
   Consider $ID_j$ as the leader node for round $k + 1$.
3. Consensus. For every round $r \in \{1, \ldots, \lceil \log n_i \rceil\}$,
   (a) Gossip $S_i$ to the network.
   (b) Let $\mathcal{S}_i$ be the collection of identity sets that node $P_i$ receives from the network after running the previous step.
       Add $S_i$ to $\mathcal{S}_i$ as well. Also, let $T_i$ be the set of all public keys that occur in more than $n/2$ sets in $\mathcal{S}_i$.
   (c) If $P_i$ is the leader node, $S_i \leftarrow T_i$ and gossip $T_i$. Otherwise, it receives $T_j$ from the leader node.
   (d) If each public key in $T_i$ (or $T_j$) occurs in at least n sets in $\mathcal{S}_i$, then $S_i \leftarrow T_i$ (or $T_j$).
4. Output $S_i$.

---

Figure 6:
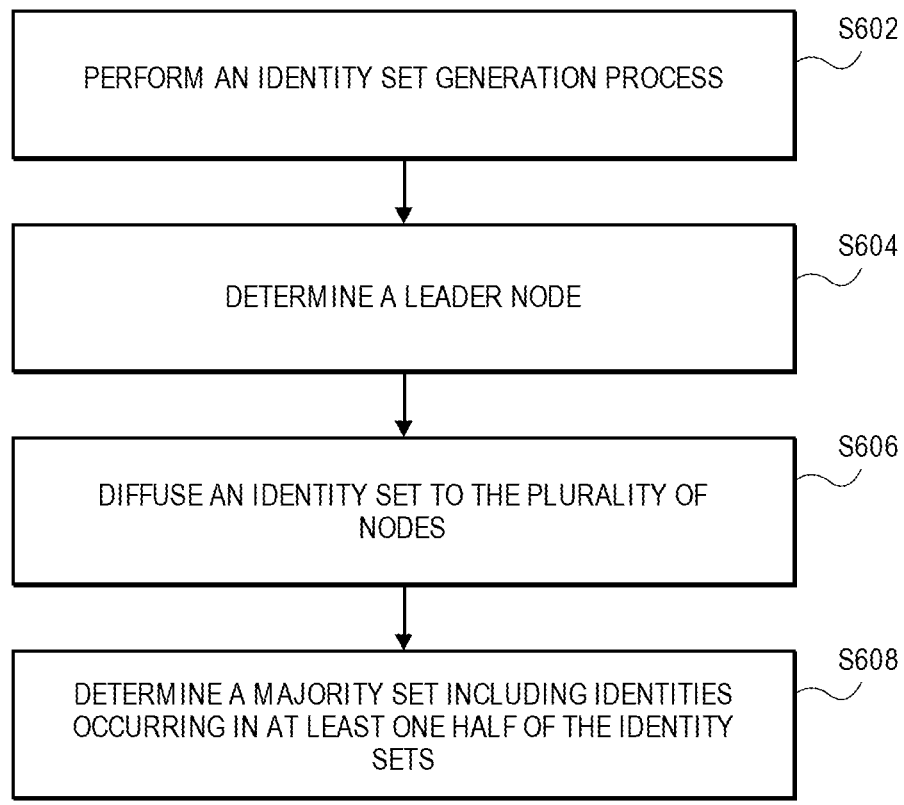
FIG. 6 shows a method of performing a consensus process according to an embodiment of the invention.

Protocol 2 is further described in FIG. 6, which shows a method of performing a consensus process according to an embodiment of the invention. The method illustrated in FIG. 6 will be described in the context of a system that has already performed phase I, as described herein. It is understood, however, that the invention can be applied to other circumstances (e.g., a system that determines consensus on data sets, etc.). Although the steps are illustrated in a specific order, it is understood that embodiments of the invention may include methods that have the steps in different orders. In addition, steps may be omitted or added and may still be within embodiments of the invention.

At step S602, each node of a plurality of nodes can perform an identity set generation process, as described herein. At step S604, after performing the identity set generation process, each node can store an identity set. Each node of the plurality of nodes can determine a leader node. In some embodiments, the nodes can determine the leader node by first determining a number of buckets to split the identity set into, as described herein. After splitting the identity set into buckets, each node can determine a smallest hash value of a plurality of hash values of the identity set in that bucket. Each node can then determine an identity of the identity set associated with the smallest hash value. In some embodiments, a node can determine that it is the leader node. In other embodiments, a node can determine that another node of the plurality of nodes is the leader node.

The nodes can determine the leader node using the smallest hash value as it is a convenient value that each node can determine. However, it is understood, that the nodes can use different rules and/or logic to select a particular hash value as being associated with the leader node, such as, but not limited to, the largest hash value, the median hash value, etc.

At step S606, after determining the leader node, each node can diffuse an identity set to the plurality of nodes. Each node can receive one identity set from every other node in the plurality of nodes. However, in some cases, a malicious node may transmit an identity set to some nodes and not to other nodes. In this case, a node may receive a number of identity sets less than the number of nodes in the plurality of nodes. Each node can create a set of identity sets comprising each of the received identity sets. The set of identity sets can be constructed using any suitable method described herein.

At step S608, each node of the plurality of nodes can determine a majority set comprising identities that occur in at least one half of the identity sets in the set of identity sets. By receiving the plurality of identity sets and determining the majority set, the node can determine which identities that at least ½ of the plurality of nodes believe to be honest nodes.

In some embodiments, after step S608, the leader node can diffuse the majority set of the leader node to the plurality of nodes. For example, a node (e.g., a leader node) can receive three identity sets. A first identity set can include identities from nodes 1, 2, and 3. A second identity set can include identities from nodes 1 and 2. A third identity set can include identities from nodes 1, 2, and 4. The node can determine a majority set including the identities of nodes 1 and 2, since these identities occur in at least one half of the received identity sets. The leader node can then transmit the majority set to the plurality of nodes. Each node of the plurality of nodes can receive the leader node's majority set.

After receiving the majority set from the leader node, each node can verify the majority set of the leader node. Each node can verify that each identity (i.e., public key) in the received majority set occurs in at least one half of the identity sets in the set of identity sets stored by the node. If the node verifies the majority set of the leader node, then the node can update its own identity set based on the majority set of the leader node.

Each node can now store a majority set, for the round, that includes identities of the honest nodes. Each node can repeat the previous steps for each round that was previously determined by splitting the identity set into buckets.

C. Security Analysis

Next, the security of methods according to embodiments of the invention will be discussed. In some embodiments, it can be possible for the adversary to make different honest nodes believe in different orders of who is the leader in a given round. The following lemma can help to establish that the relative orders for the leadership of honest nodes may be consistent among all the honest nodes.

Lemma 4: let $P_i$ be an honest node and $\sigma_i: U_{i:honest} P_i \to \{0, \ldots, n_i-1\}$ be a function that, in the view of $P_i$, may assign each honest node $P_j$ to round $r=\sigma_i(P_j)$ if a hash value $$h_j \in \left[\dfrac{r}{n_i}, \dfrac{r+1}{n_i}\right).$$

Then, with probability 1−o(1), for every other honest node $P_j$, it can be the case that $\sigma_j(P_k) = \sigma_i(P_k)$ for each honest public key $P_k$. Recall that for all honest public keys $P_k$, the diffuse protocol may allow every honest node to receive the same value of $h_k$. Thus, if $n_i = n_j$, then there may be a unique integer m such that $$h_k \in \left(\frac{m}{n_i}, \frac{m+1}{n_i}\right].$$

This can imply $\sigma_j(P_k) = \sigma_i(P_k)$.

Now, without loss of generality, $n_i < n_j$, which can imply $\sigma_j(P_k) \le \sigma_i(P_k)$ (since the intervals corresponding to $n_i$ can be larger). Let $\varepsilon_{i,j,k}$ be the event that $\sigma_j(P_k) \ne \sigma_i(P_k)$ for honest nodes $P_i, P_j$, and $P_k$ such that $P_i \ne P_j$. Then, $$Pr(\varepsilon_{i,j,k} \mid n_i < n_j) = \sum_{m=0}^{n_i-1} Pr(\varepsilon_{i,j,k} \mid n_i = m, n_i < n_j) Pr(n_i = m) =$$

$$\frac{1}{n_i} \sum_{m=0}^{n_i-1} Pr(\sigma_j(P_k) < \sigma_i(P_k) \mid n_i = m, n_i < n_j)$$

Now, for $\sigma_j(P_k) < \sigma_i(P_k)$ to be true, it can be the case $$\frac{\sigma_j(P_k) + 1}{n_j} > \frac{\sigma_i(P_k)}{m},$$

which can imply that $$\frac{n_j}{m} < \frac{(\sigma_j(P_k) + 1)}{\sigma_i(P_k)}.$$

Now, $$\frac{n_j}{m} = \frac{2\lceil \log|S_j|\rceil}{2\lceil \log|S_i|\rceil} \ge \frac{|S_j|}{2|S_i|} \ge \frac{1}{3} \text{ (since } |S_j| \ge 2n/3 \text{ and } |S_j| \le n$$

(from Corollary 2). Hence, for $\varepsilon_{i,j,k}$ to be true, it can be true that $$\frac{(\sigma_j(P_k) + 1)}{\sigma_i(P_k)} \ge \frac{1}{3},$$

which can imply $$\sigma_j(P_k) \ge \frac{\sigma_i(P_k)}{3} - 1.$$

Since $\sigma_j(P_k) \le \sigma_i(P_k)$, this can imply $\sigma_i(P_k) \ge 3/2$, which may be the same as $\sigma_i(P_k) \ge 2$ (since $\sigma_i(P_k)$ can be an integer).

To deal with the inconsistency in the views of which node is the leader node (when the leader node can be adversarial), the solutions for the PoW puzzles may have sufficient entropy in them. In some embodiments, the puzzles for the PoW computed by each node, above, can involve freshly generated challenges by the honest nodes.

In the lemmas below, an analogy will be described to derive a bound on the number of rounds it can take to reach the first round in which all honest nodes may agree on which node is the leader node. Such a round, referred to as a good round, may have a consistent view of the leader node throughout. A good round can be characterized by saying that the interval corresponding to this round can have only honest nodes' solutions to the PoW puzzles. A unique leader node can be agreed upon by all the honest nodes, and the protocol by Ren et al., see [Ling Ren, Kartik Nayak, Ittai Abraham, and Srinivas Devadas. Practical synchronous byzantine consensus. *CoRR*, abs/1704.02397, 2017], can terminate by the end of this round. Consequently, the system has consensus on the set of IDs.

Lemma 5: for a given constant $\varepsilon \in (0,1)$, consider throwing $n\varepsilon$ red balls and $n(1-\varepsilon)$ blue balls in n bins (numbered 1 through n) independently and uniformly at random. Then, with high probability in n, there may exist a bin with only red balls in the first $O(\log n)$ bins. $X_i$ can be an indicator random variable for the event that bin i contains only red balls. Then $$\mathbb{E}(X_i) = \left(1 - \frac{1}{n}\right)^{n(1-\varepsilon)}\left(1 - \left(1 - \frac{1}{n}\right)^{n\varepsilon}\right).$$

Now, using the fact that $1+x \le e^x$ for all real x and that $$\left(1 - \frac{1}{n}\right)^{n(1-\varepsilon)} \ge \varepsilon$$

(by Taylor expansion), $\mathbb{E}(X_i) \ge \varepsilon(1-e^{-\varepsilon})$, which may be a constant. Since $X_i$'s can be negatively associated, standard Chernoff bounds, see [Devdatt Dubhashi and Desh Ranjan. Balls and bins: A study in negative dependence. *Random Structures and Algorithms*, 13(2):99-124, 1998], may establish a tight concentration around this mean.

For $\varepsilon > 2/3$ (as is for the case with $f < n/3$), Lemma 5 states that the probability that a given bin contains only red balls can be about 0.342. Thus, in expectation, one in every 3 bins may contain only red balls and hence, the first four rounds can be expected to contain the good round for the algorithm and, with high probability in n, the first $\log(n)$ rounds can include this good round as well. For any given round r of the protocol describe above, $S_i^{(r)}$ may denote the set of public keys with honest node $P_i$ at the end of round r.

Lemma 6: let $S_h = \{pk_i | P_i \text{ is honest}\}$. In any round r, it can be the case that $S_h \subseteq S_i^{(r)}$ for every honest node $P_i$. $pk \in S_h$ may be the public key of some honest node, i.e., $P_i$. From Lemma 1, $P_i \in S_i$ for all honest nodes $P_i$. Thus, when any honest node $P_i$ gossips an identity set $S_i$, this set can contain the public key pk. Since the number of honest nodes may be strictly more than $n/2$, consequently, the set of identity sets $\mathcal{S}_i$ contains a public key pk for every honest node $P_i$. Hence, independent of who the leader node for round r is, $pk \in S_i^{(r)}$ for all honest $P_i$. This can imply $S_h \subseteq S_i^{(r)}$.

Lemma 7: (safety) in any round r, it can be the case that $$S^{(r)[Opt]} =^{def} U_{i:honest} S_i^{(r)}$$

formed by the union of all these identity sets can satisfy $S^{(r)} \subseteq U_{i:honest} S_i$, i.e. it may contain no new ID (which may not be contained in any honest node's set at the end of the protocol). From Lemma 6, the sets $S^{(r)}$ and $U_{i:honest} S_i$ may have a non-empty intersection. In some embodiments, there may be a public key $pk \in S^{(r)} \setminus U_{i:honest} S_i$ and that r may be a smallest such round index in the protocol when this happens. From Lemma 1, this public key pk can belong to the adversary. Since pk E $S^{(r)}$, some honest node $P_i$ can contain $pk \in S_i^r$). However, since $pk \notin U_{i:honest} S_i$, then $P_i$ may not have contained $pk \in S_i$. Now, the following two cases may arise.

In a first case, $P_i$ can be the leader node in round r and may have added the public key pk to $S_i^{(r)}$). For this to happen, the public key pk can have occurred in more than n/2 identity sets in the set of identity sets $\mathcal{S}_i$ in round r. However, since the set of identity sets $\mathcal{S}_i$ contains the identity sets of all honest nodes, and that the number of adversarial identity sets can be less than n/3, at least one honest node $P_j$ can have $pk \in S_j^{(r-1)}$. r may be the smallest round index in which the public key pk is added to some honest node's identity set, which may be a contradiction.

In a second case, the node $P_i$ may not be the leader node in round r and the node may have added the public key pk to $S_i^{(r)}$. In this case, $P_i$ may have received a majority set $T_i$ from a leader $P_j$ (who, in some cases, may be adversarial) in this round r such that $pk \in T_j$ and pk can occur in at least 3n/4 identity sets in the set of identity sets $\mathcal{S}_i$. From the same reasoning as above, this may imply that at least one honest node can contain the public key pk at the end of round r−1, which may be a contradiction.

Lemma 8: let r be the index of the first good round. Then, for every pair of honest nodes $P_i$ and $P_j$, it can be the case that $S_i^{(r)} = S_j^{(r)}$. In some embodiments, $S_i^{(r)} \neq S_j^{(r)}$ in the first good round r. $P_k$ may be an honest node that may be the leader for round r. Then, without loss of generality, the following two cases may arise.

In a first case, $P_i = P_k$. In this case, for $S_i^{(r)} \neq S_j^{(r)}$ to happen, the node $P_j$ may have received a majority set $T_i$ from $P_i$ such that some public key $pk \in T_i$ may not be contained in n/2 of the identity sets in the set of identity sets $\mathcal{S}_j$. This may imply that there can be some honest node $P_u$ which may not contain the public key pk in its set $S_u^{(r-1)}$, implying that the public key pk may belong to the adversary. However, since $pk \in T_i$, the node $P_i$ can have contained the public key pk in at least n/2 of the identity sets in the set of identity sets $\mathcal{S}_i$. This may imply that at least one honest node $P_v$ can contain the public key pk in its set $S_v^{(r-1)}$. Or alternatively, in a second case, $P_i, P_j \neq P_k$.

Lemma 9: (liveness) if the bucket is empty or it contains at least one dishonest node, the consensus part of the protocol may proceed to the next round (i.e., next bucket). There may be four cases for a bucket: (1) one malicious leader: this may follow from Srini's proof; (2) some honest and some malicious leaders: in the worst case, all honest nodes may continue to the next bucket; (3) all malicious leaders: this case can be reduced from the case number 2 because some malicious leaders can perform actions honestly; (4) an empty bucket: this case can be reduced to the case number 1 because the malicious leaders can remain silent in that round and may also follow from Srini's proof.

Lemma 10: (integrity) for all rounds r'>r and every honest party $P_i$, it can be the case that $S_i^{(r')} = S_i^{(r)}$. This can be shown in [Ling Ren, Kartik Nayak, Ittai Abraham, and Srinivas Devadas. Practical synchronous byzantine consensus. CoRR, abs/1704.02397, 2017].

Theorem 1: (consistency) with high probability in n, all honest nodes may output the same set after $\lceil \log n \rceil$ rounds, where n is the number of nodes. Each honest node may generate a challenge string randomly, from Lemma 5, with high probability in n, there may be a bucket that can contain the IDs of only honest nodes. Such a round may have a consistent view of the leader node throughout. Once the system begins this round, a unique leader node can be agreed upon by all the honest nodes and, in some embodiments, the protocol by Ren et. al., see [Ling Ren, Kartik Nayak, Ittai Abraham, and Srinivas Devadas. Practical synchronous byzantine consensus. CoRR, abs/1704.02397, 2017], may allow all the honest nodes to agree on their local identity sets at the end of this round. Finally, from Lemma 7, when the protocol terminates, there may be consensus on the identity sets among the nodes.

Theorem 2: (bandwidth) the total number of bits sent by each honest node may be $O(n^2)$ in for the first phase and $O(nd \log^2 n)$ for the second phase, where d can be a maximum number of neighbors (i.e., surrounding nodes) of any node in the network. The first part of the theorem may follow directly from the analysis above. For the second part, note that in each round, each node can gossip its set of nodes to every other node twice. This set may contain the list of public keys for at least all the honest nodes and hence, may be of size $O(n \log n)$. Further, since the gossip protocol may forward the message to immediate neighbors, a total of d such messages can be sent for a total of $O(nd \log^2 n)$ bits sent per node per round. Further, some methods according to embodiments of the invention may handle churn, increase resilience, handle adaptive adversaries, and reduce bandwidth.

V. Conclusion

Methods according to embodiments of the invention may allow a set of nodes to agree on an identity set for other nodes such that the number of Sybil-identities is minimized. Embodiments of the invention can be efficient in terms of simplicity, bandwidth, and number of solutions to PoW puzzles performed by the nodes. With high probability, termination may occur in a logarithmic number of rounds.

Embodiments of the invention have a number of advantages. For example, the nodes may determine an identity set of all honest nodes without knowledge of the number of nodes that may initially want to join the system and without an initial trusted setup. Additionally, embodiments of the invention allow for dynamic arrival and departure of nodes, while preserving the required security and bandwidth in each round. Another advantage is that embodiments of the invention may be performed in a constant number of rounds.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
performing, by a node comprising a computer device in a plurality of nodes comprising computer devices, an identity set generation process to form an identity set comprising node identities;
determining, by the node, a leader node;
diffusing, by the node, the identity set to the other nodes in the plurality of nodes, wherein a malicious node also transmits a malicious node identity set to some nodes and does not transmit the malicious node identity set to other nodes;
receiving, by the node, a majority set from the leader node, wherein the leader node diffuses the majority set to nodes in the plurality of nodes;
verifying, by the node, the majority set of the leader node by determining that the majority set includes identities occurring in at least one half of the identity sets generated by the plurality of nodes;
updating, by the node, the identity set based on the majority set of the leader node;
determining, by the node, a final identity set of nodes based upon the updated identity set, wherein the final set of nodes contains identities of all honest nodes in the presence of a computationally bounded Byzantine adversary, without any knowledge of the number of nodes that may initially want to join; and
communicating, by the node, with one or more nodes in the final identity set of nodes.

2. The method of claim 1, wherein determining the leader node further comprises:
determining, by the node, a smallest hash value of a plurality of hash values received from the plurality of nodes;
determining, by the node, an identity of the identity set associated with the smallest hash value; and
selecting, by the node, a second node associated with the smallest hash value to be the leader node.

3. The method of claim 2, wherein the node is the second node.

4. The method of claim 1, wherein the final identity set of nodes is free of nodes created by a Sybil attack.

5. The method of claim 1,
further comprising: receiving identity sets from the other nodes in the plurality of nodes.

6. The method of claim 1 further comprising:
splitting, by the node, the identity set into buckets, wherein each bucket is processed in a round.

7. A method comprising:
performing, by a node comprising a computer device in a plurality of nodes comprising computer devices, an identity set generation process;
determining, by the node, a leader node;
diffusing, by the node, an identity set to the other nodes in the plurality of nodes; and
determining, by the node, a majority set including identities occurring in at least one half of the identity sets, wherein the leader node diffuses the majority set of the leader node to nodes in the plurality of nodes, wherein performing the identity set generation process further comprises:
generating, by the node, a public key, a private key, and a random challenge string;
transmitting, by the node, the random challenge string to the other nodes in the plurality of nodes;
receiving, by the node, a plurality of random challenge strings from the other nodes in the plurality of nodes;
generating, by the node, a challenge set comprising the plurality of random challenge strings and the random challenge string;
determining, by the node, a nonce that solves a proof of work;
transmitting, by the node, a tuple comprising the public key, the nonce, a hash value from the proof of work, and the challenge set to the other nodes in the plurality of nodes;
receiving, by the node, a plurality of tuples from the other nodes in the plurality of nodes; and
verifying, by the node, the plurality of tuples, wherein if a tuple of the plurality of tuples is valid then storing the public key associated with the tuple in the identity set.

8. The method of claim 7, wherein the random challenge string comprises κ bits, and wherein each node of the plurality of nodes generates a different random challenge string.

9. The method of claim 7, wherein inputs to the proof of work include the public key, the challenge set, and the nonce.

10. The method of claim 9, wherein determining the nonce that solves the proof of work further comprises:
determining, by the node, the hash value which is an output of the proof of work; and
determining, by the node, that the hash value is less than a predetermined difficulty parameter.

11. A node comprising:
a processor;
a memory device; and
a computer-readable medium coupled to the processor, the computer-readable medium comprising code executable by the processor for implementing a method comprising:
performing, by the node comprising a computer device in a plurality of nodes comprising computer devices, an identity set generation process to form an identity set comprising node identities;
determining, by the node, a leader node;
diffusing, by the node, the identity set to the other nodes plurality of nodes, wherein a malicious node also transmits a malicious node identity set to some nodes and does not transmit the malicious node identity set to other nodes;

receiving, by the node, a majority set from the leader node, wherein the leader node diffuses the majority set to nodes in the plurality of nodes;

verifying, by the node, the majority set of the leader node by determining that the majority set includes identities occurring in at least one half of the identity sets generated by the plurality of nodes;

updating, by the node, the identity set based on the majority set of the leader node;

determining, by the node, a final identity set of nodes based upon the updated identity set, wherein the final set of nodes contains identities of all honest nodes in the presence of a computationally bounded Byzantine adversary, without any knowledge of the number of nodes that may initially want to join; and communicating, by the node, with one or more nodes in the final identity set of nodes.

12. The node of claim 11, wherein determining the leader node further comprises:

determining a smallest hash value of a plurality of hash values received from the plurality of nodes;

determining an identity of the identity set associated with the smallest hash value; and selecting a second node associated with the smallest hash value to be the leader node.

13. The node of claim 12, wherein the node is the second node.

14. The node of claim 11, further comprising: receiving identity sets from the other nodes in the plurality of nodes.

15. The node of claim 11, wherein performing the identity set generation process further comprises:

generating a public key, a private key, and a random challenge string;

transmitting the random challenge string to the other nodes in the plurality of nodes;

receiving, by the node, a plurality of random challenge strings from the other nodes in the plurality of nodes;

generating a challenge set comprising the plurality of random challenge strings and the random challenge string;

determining a nonce that solves a proof of work;

transmitting a tuple comprising the public key, the nonce, a hash value from the proof of work, and the challenge set to the other nodes in the plurality of nodes;

receiving a plurality of tuples from the other nodes in the plurality of nodes; and verifying the plurality of tuples, wherein if a tuple of the plurality of tuples is valid then storing the public key associated associate with the tuple in the identity set.

16. The node of claim 15, wherein the random challenge string comprises $\kappa$ bits, and wherein each node of the plurality of nodes generates a different random challenge string.

17. The node of claim 15, wherein inputs to the proof of work include the public key, the challenge set, and the nonce.

18. The node of claim 17, wherein determining the nonce that solves the proof of work further comprises:

determining the hash value which is an output of the proof of work; and determining that the hash value is less than a predetermined difficulty parameter.

19. The node of claim 11, wherein the method further comprises:

splitting, by the node, the identity set into buckets, wherein each bucket is processed in a round.

* * * * *